(12) United States Patent
Judovsky et al.

(10) Patent No.: US 12,124,790 B2
(45) Date of Patent: Oct. 22, 2024

(54) APPARATUSES, SYSTEMS, AND METHODS FOR PROVIDING DYNAMIC CONTENT

(71) Applicant: Klickafy, LLC, East Grand Forks, MN (US)

(72) Inventors: Mark Patrick Judovsky, East Grand Forks, MN (US); Kushalappa Kanishka Biddanda, Nashville, TN (US)

(73) Assignee: Klickafy, LLC, East Grand Forks, MN (US)

( * ) Notice: Subject to any disclaimer, the term of this patent is extended or adjusted under 35 U.S.C. 154(b) by 0 days.

(21) Appl. No.: 16/998,888

(22) Filed: Aug. 20, 2020

(65) Prior Publication Data
US 2020/0380199 A1    Dec. 3, 2020

Related U.S. Application Data

(63) Continuation-in-part of application No. 16/687,208, filed on Nov. 18, 2019, now Pat. No. 11,809,809,
(Continued)

(51) Int. Cl.
*G06F 40/134* (2020.01)
*G06Q 50/00* (2012.01)
(Continued)

(52) U.S. Cl.
CPC ......... *G06F 40/134* (2020.01); *G06Q 50/01* (2013.01); *H04L 51/04* (2013.01); *H04L 51/10* (2013.01)

(58) Field of Classification Search
CPC ....... G06F 40/134; G06Q 50/01; H04L 51/04; H04L 51/10
(Continued)

(56) References Cited

U.S. PATENT DOCUMENTS 6,693,652 B1    2/2004    Barrus et al.
7,769,814 B2 *  8/2010    Wu .................... H04L 51/18
                                                      709/204
(Continued)

FOREIGN PATENT DOCUMENTS

WO    2012121555 A2    9/2012

OTHER PUBLICATIONS

International Preliminary Report on Patentability for corresponding PCT/US2014/060731, dated Oct. 25, 2016, 6 pages.
(Continued)

*Primary Examiner* — Hope C Sheffield
(74) *Attorney, Agent, or Firm* — Patterson Intellectual Property Law, PC

(57) ABSTRACT

Apparatuses, systems, and methods are provided for enabling conditional message content in a messaging system. The method includes receiving a message, examining the received message to determine content of the received message, selectively extracting at least one feature of the content of the received message, storing a representation associated with the content, associating at least a portion of the content with at least one set of data or metadata, determining at least one condition associated with one or more of the content or the at least one set of data or metadata, and selectively performing at least one operation on the content of the message based at least in part upon the determined at least one condition.

9 Claims, 29 Drawing Sheets

Related U.S. Application Data which is a continuation of application No. 14/259,555, filed on Apr. 23, 2014, now Pat. No. 10,482,163.

(51) Int. Cl.
*H04L 51/04* (2022.01)
*H04L 51/10* (2022.01)

(58) Field of Classification Search
USPC .......................................................... 715/205
See application file for complete search history.

(56) References Cited

U.S. PATENT DOCUMENTS

| | | | |
|---|---|---|---|
| 8,290,478 B2 | 10/2012 | Shim et al. | |
| 8,826,139 B1* | 9/2014 | Wendkos | G01C 21/3697 |
| | | | 715/736 |
| 9,137,185 B2 | 9/2015 | Costenaro et al. | |
| 9,417,765 B1 | 8/2016 | Lewis et al. | |
| 9,906,615 B1 | 2/2018 | Jaskiewicz et al. | |
| 2002/0126135 A1 | 9/2002 | Ball et al. | |
| 2003/0046690 A1 | 3/2003 | Miller | |
| 2004/0034688 A1* | 2/2004 | Dunn | H04L 67/10 |
| | | | 709/206 |
| 2005/0156873 A1 | 7/2005 | Walter et al. | |
| 2005/0204309 A1 | 9/2005 | Szeto | |
| 2007/0136419 A1 | 6/2007 | Taylor et al. | |
| 2007/0266090 A1 | 11/2007 | Len | |
| 2008/0031251 A1* | 2/2008 | Rajan | H04M 1/7243 |
| | | | 370/392 |
| 2008/0281930 A1* | 11/2008 | Hartselle | H04L 65/4025 |
| | | | 709/206 |
| 2010/0017289 A1 | 1/2010 | Sah et al. | |
| 2010/0125811 A1 | 5/2010 | Moore et al. | |
| 2011/0010737 A1 | 1/2011 | Bouazizi et al. | |
| 2012/0284093 A1* | 11/2012 | Evans | H04W 4/21 |
| | | | 705/14.1 |
| 2012/0304074 A1 | 11/2012 | Ooi et al. | |
| 2013/0086190 A1* | 4/2013 | Durand | H04L 51/046 |
| | | | 709/206 |
| 2013/0124309 A1 | 5/2013 | Traasdahl et al. | |
| 2013/0159431 A1 | 6/2013 | Berry et al. | |
| 2013/0159432 A1 | 6/2013 | Deering et al. | |
| 2013/0159433 A1* | 6/2013 | Chavan | G06Q 30/0241 |
| | | | 709/206 |
| 2013/0339983 A1 | 12/2013 | Dai et al. | |
| 2014/0092101 A1 | 4/2014 | Lee et al. | |
| 2014/0101252 A1 | 4/2014 | Kolodziej | |
| 2014/0201527 A1 | 7/2014 | Krivorot | |
| 2014/0289259 A1 | 9/2014 | Tamma et al. | |
| 2015/0244662 A1* | 8/2015 | De Alwis | H04L 51/10 |
| | | | 709/206 |
| 2018/0032997 A1 | 2/2018 | Gordon et al. | |

OTHER PUBLICATIONS

International Search Report for corresponding PCT/US2014/060731, dated Jan. 14, 2015, 3 pages.
Written Opinion of the International Searching Authority for corresponding PCT/US2014/060731, dated Jan. 14, 2015, 5 pages.

* cited by examiner

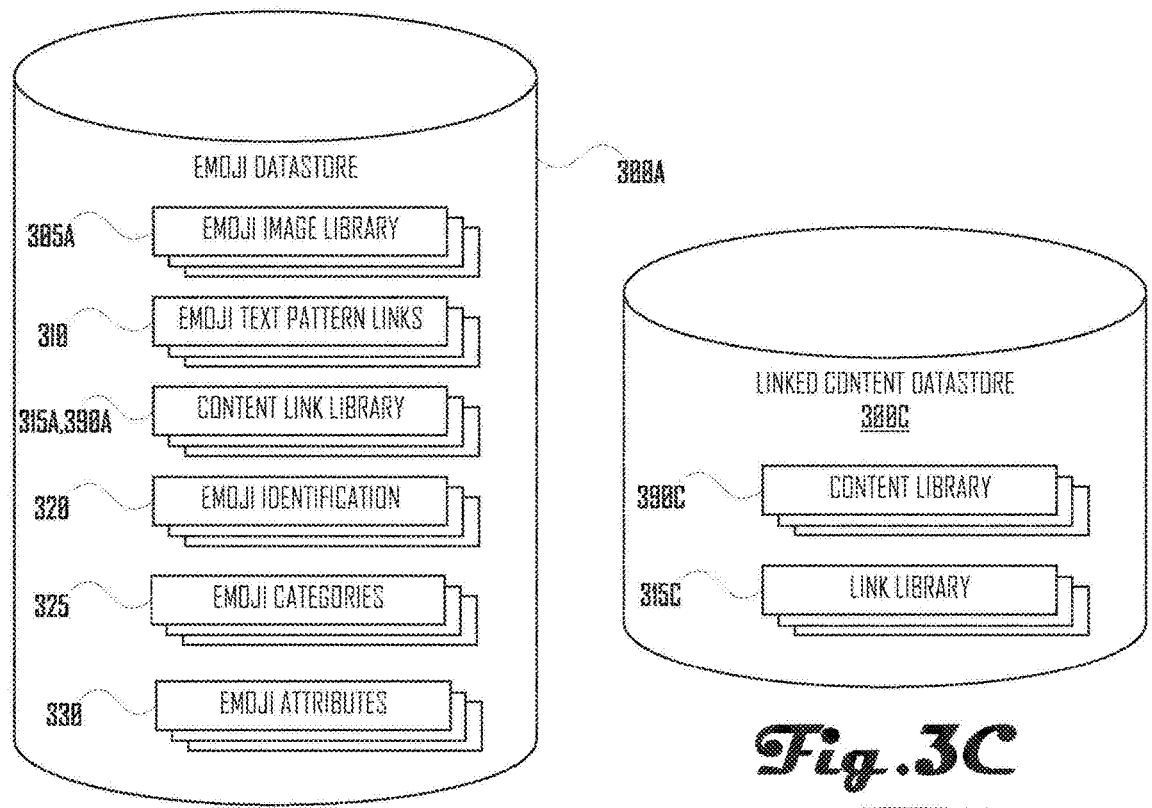
Fig.3A
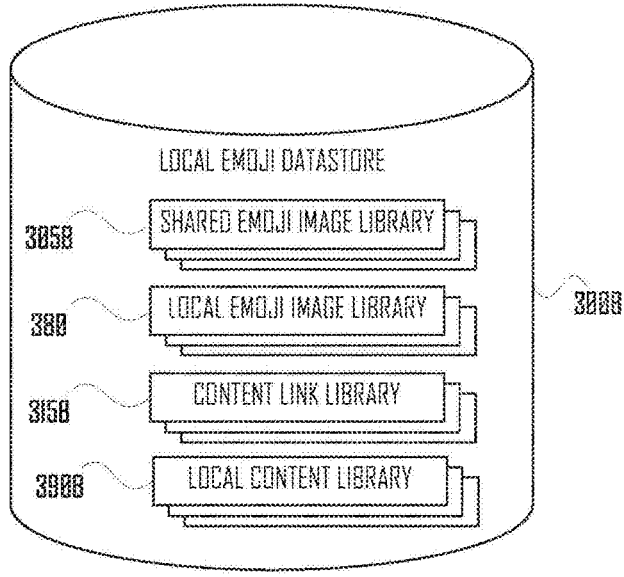
Fig.3B
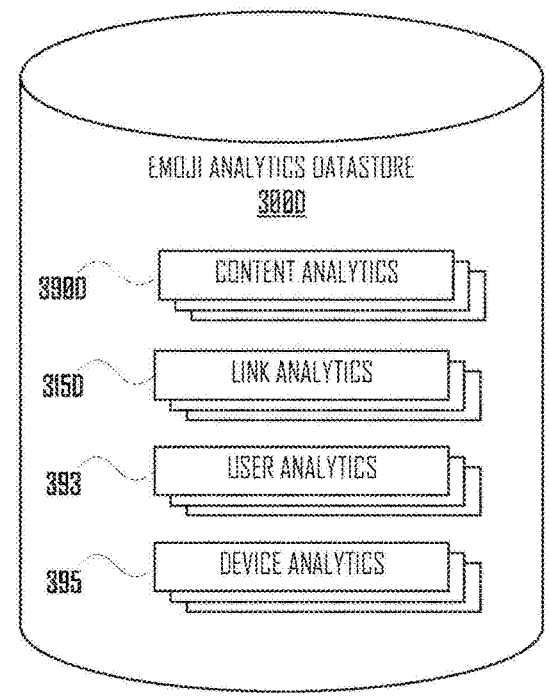
Fig.3C
Fig.3D

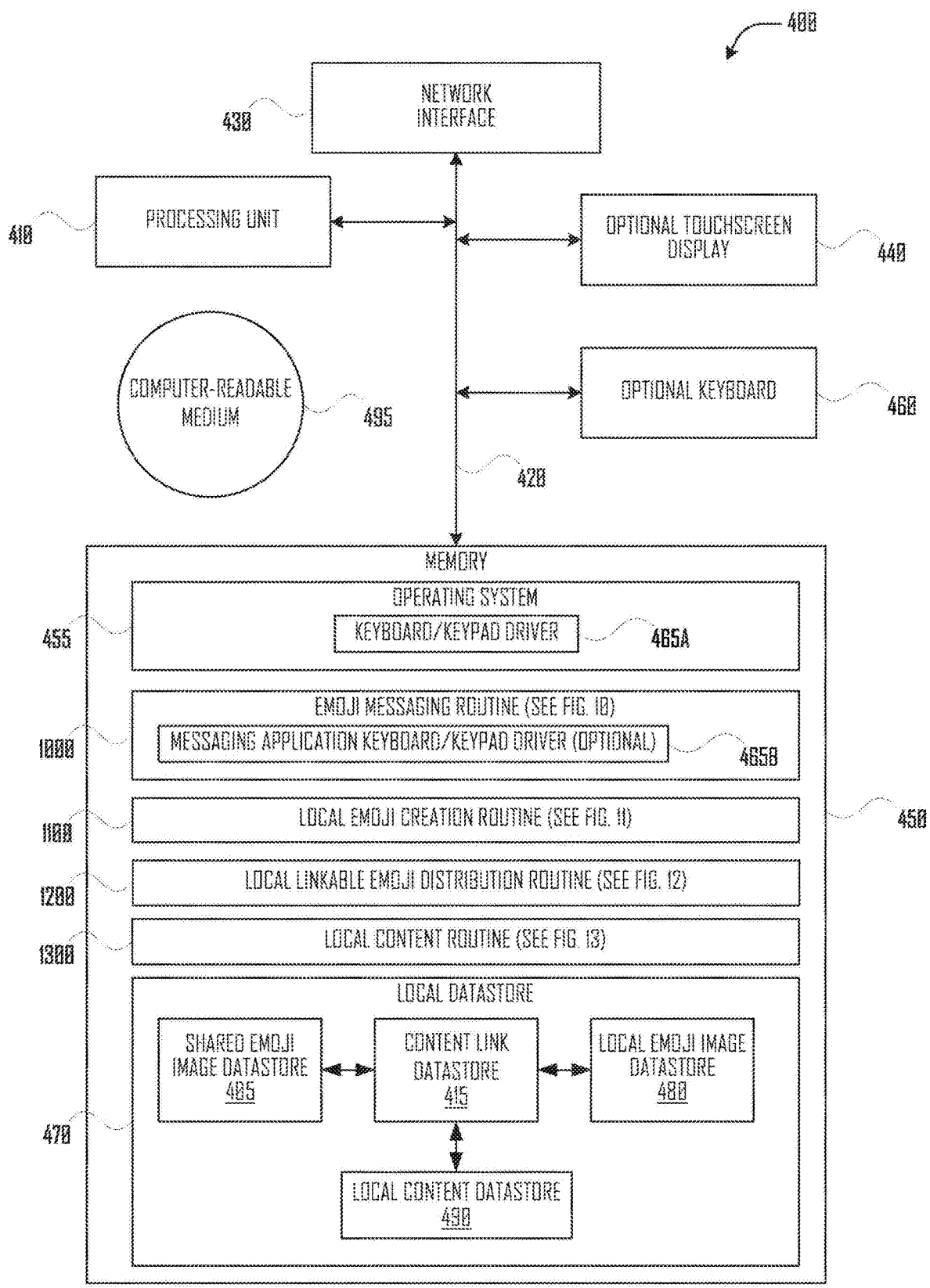

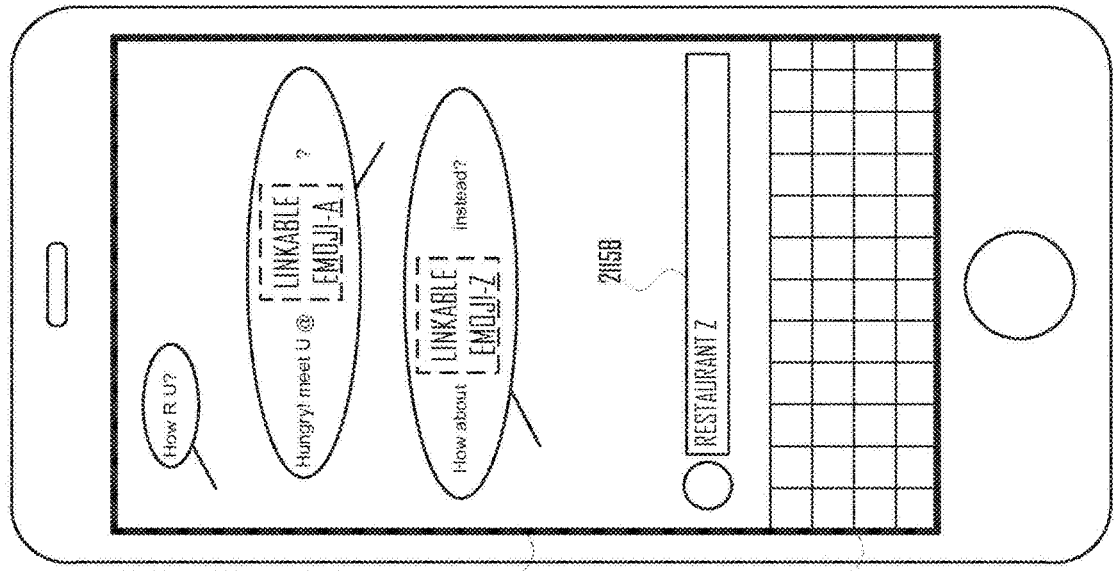
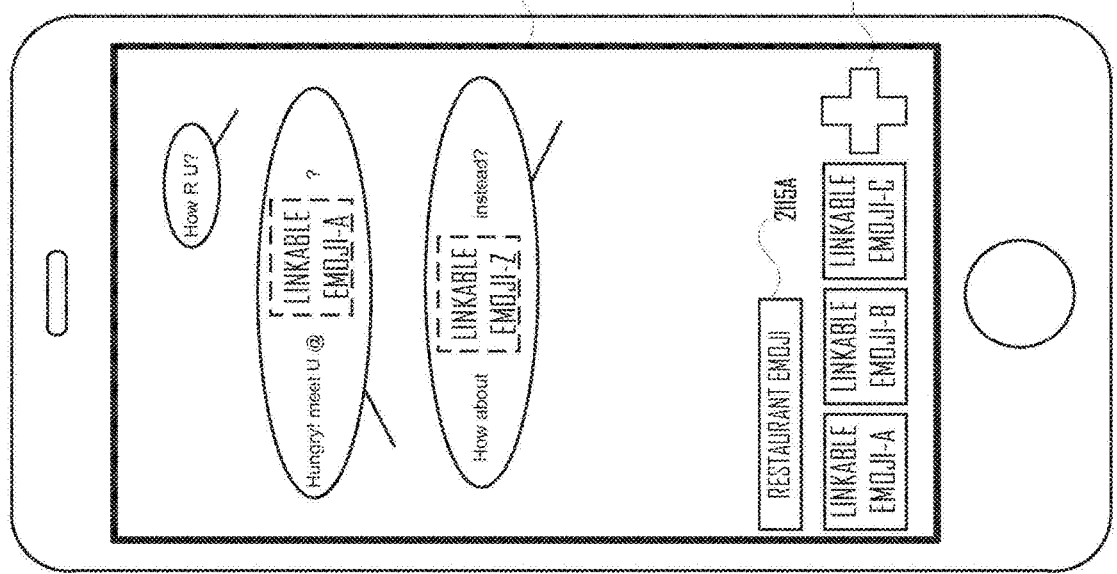
Fig. 21

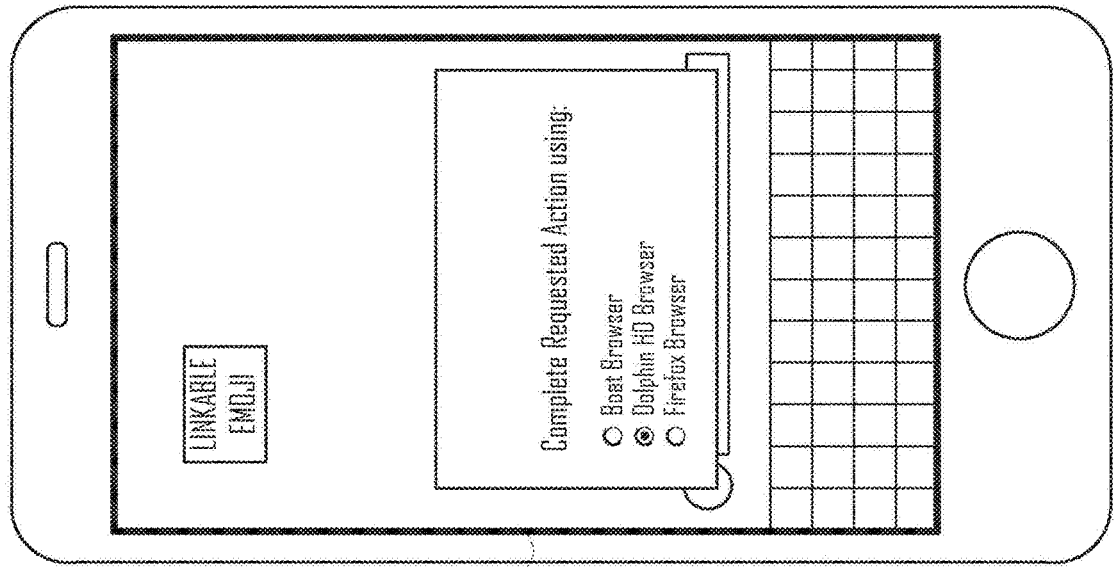
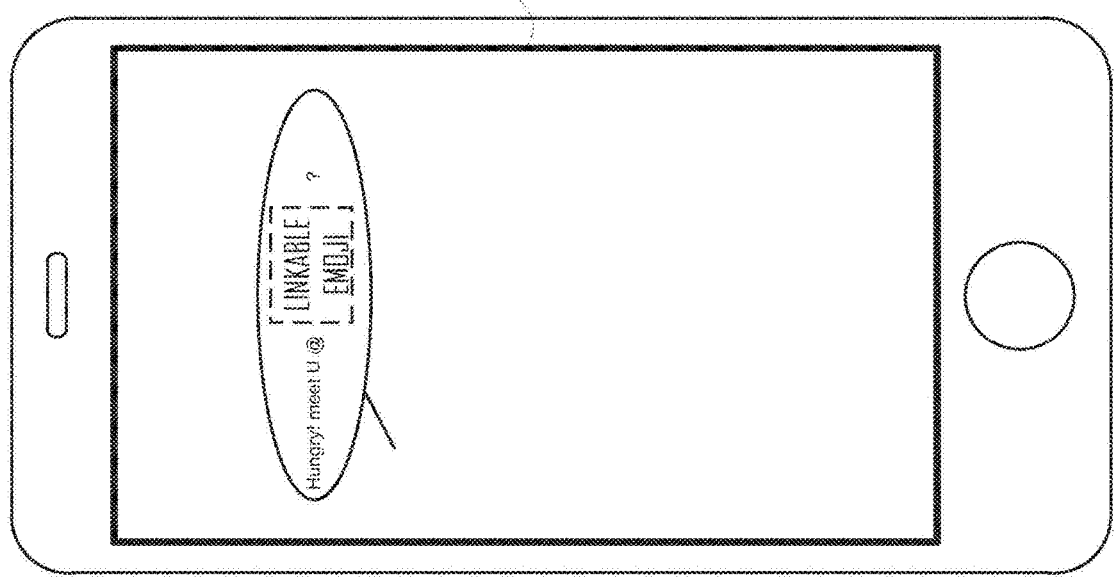
Fig. 22

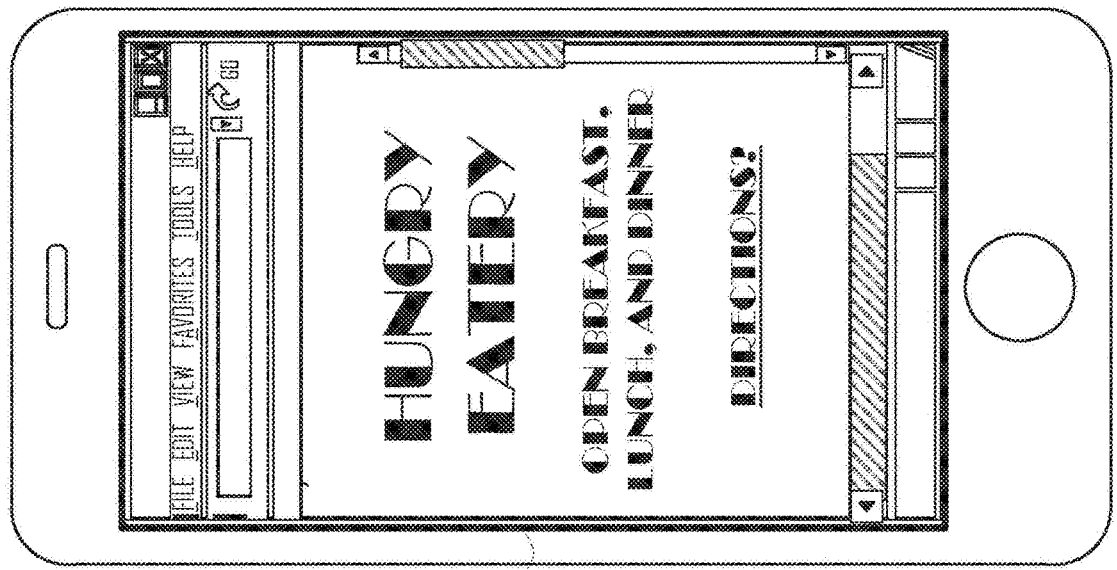
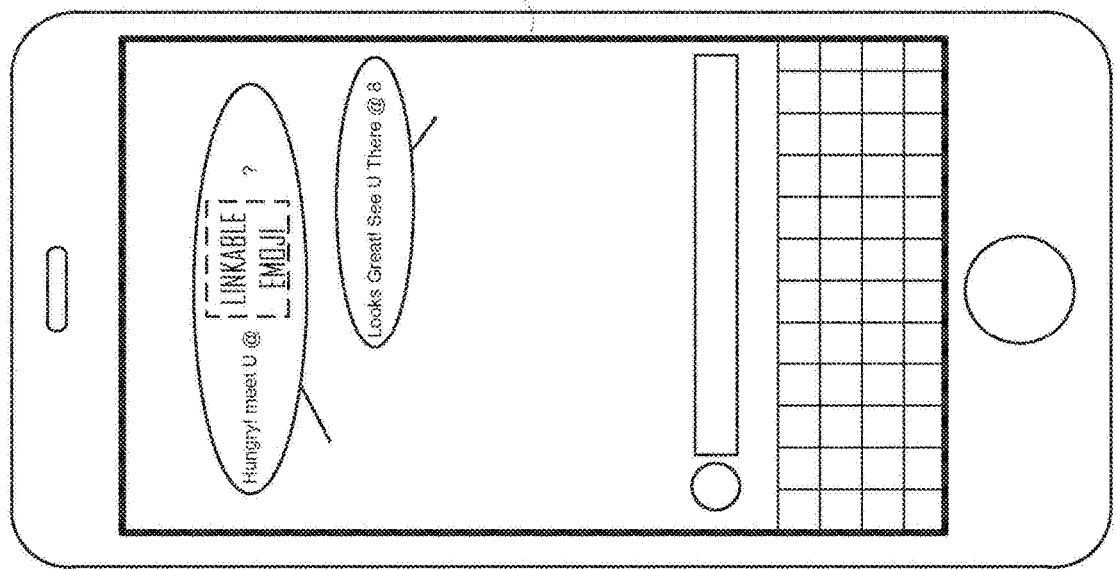
Fig. 23

APPARATUSES, SYSTEMS, AND METHODS FOR PROVIDING DYNAMIC CONTENT

CROSS-REFERENCE TO RELATED APPLICATIONS

This application is a continuation-in-part of U.S. patent application Ser. No. 16/687,208, filed Nov. 18, 2019 for "CLICKABLE EMOJI," which is a continuation of U.S. patent application Ser. No. 14/259,555, filed Apr. 23, 2014, for "CLICKABLE EMOJI," each of which is hereby incorporated by reference in its entirety.

FIELD

The present disclosure relates to clickable instant messaging. More particularly, to systems and methods for providing hyperlinked icons, images, and emoji in a real-time messaging environment, such as text messaging.

BACKGROUND

Computer systems are regularly developing new methods of interacting with users to improve the user experience and facilitate new functionality. For example, with the development of video display devices, an older punch card interface gave way to a text-based interface. Later as the quality of available display devices improved, the text-based interfaces were largely supplanted by graphical user interfaces (GUI), which often use computer icons to help launch programs instead of requiring text commands.

A notable exception to the digital industry's transition from text-based interfaces to graphical user interfaces has been in communication software. More specifically messaging systems, such as text messaging, instant messaging, and email are still largely text-based. Still, to overcome some of the limitations of text messaging, users often use a text messaging shorthand. A portion of this messaging shorthand, referred to as emoticons and/or emoji, produces text-based images to convey additional information frequently involving the emotional context of the message. Emoticons, like the smiley, are both a response to the limited storage and transmission bandwidth used in electronic messaging systems and the need to provide emotive context to a text message.

Emoticons have become both abundant and more sophisticated in their keyboard representations of varying emotions. In fact many emoticons, like the smiley, have developed from pure keyboard character combinations into real icons that are widely used in all forms of electronic communications. In adding an emotional overlay to the text, the emoticons have also enabled electronic messages to substitute for and frequently supplant voice-to-voice messaging. However, despite these advances, emoticons still remain relative static with respect to the content being added to a message. For example, a smiley sent in a message yesterday remains a smiley in the message even if there might be a more appropriate emoticon now, such as a sad face or green face. Moreover, due to the limited storage and transmission bandwidth used in electronic real-time messaging systems, emoticons have never been linkable to additional content.

Existing communications, such as Simple Message Service (SMS) text messaging, might only show what is originally downloaded as part of a message, for example an animated GIF file, which is stored on a local storage of a receiving device. Instant messaging and other communication systems may have a persistent connection but look for incoming new content—not content that has already been sent and is being updated or modified. However, numerous deficiencies exist for such existing messaging systems and the lack of capabilities for content and/or metadata updating.

SUMMARY

The present disclosure provides exemplary embodiments of apparatuses, systems, and methods for providing dynamic content.

Implementations consistent with the present disclosure may include persistent (or semi-active) connection with communications such as text messaging. When a message is loaded or is displayed, a messaging application or communication component associated with a device may be configured to actively go back to a server for a refresh of at least a portion of information.

According to aspects of the present disclosure, provided is a computer-implemented method for providing conditional message content in a messaging system. The method includes receiving a message, examining the received message to determine content of the received message, associating at least a portion of the content with at least one set of data or metadata, determining at least one condition associated with the one or more of the content or the at least one set of data or metadata, and selectively performing at least one operation on the content of the message based at least in part upon the determined at least one condition.

The receiving the message may include receiving the message from a first client device at an application server, and further includes monitoring messaging between the first client device and a second client device to collect contextual data related to the content. The contextual data may include a social parameter, a message content condition, or device information of the first client device or the second client device. The content of the received message may include image data. The selectively performing at least one operation may include performing at least one of selecting, modifying, adding, or removing data or metadata responsive to the determined at least one condition associated with the content. A representation of at least one of the received message, the content, or at least one feature of the content may be stored at a database by storing the representation and further includes mapping the representation to at least one message or content condition. The at least one message or condition may be referenced in real-time while monitoring communications received from at least one client device. The content of at least one message of the monitored communications may be modified based at least in part upon the at least one message or content conditional parameter.

According to a further aspect of the present disclosure, provided is a computer-implemented method for providing conditional message content in a messaging system. The method includes receiving a message, examining the received message to determine content of the received message, selectively extracting at least one feature of the content of the received message, storing a representation associated with the content, determining at least one condition associated with the content, and selectively performing at least one operation on the content of the message based at least in part upon the determined at least one condition.

The receiving the message may include receiving the message from a first client device at an application server, and further includes monitoring messaging between the first client device and a second client device to collect contextual data related to the content. The contextual data may include a social parameter, a message content condition, or device information of the first client device or the second client device. The content of the received message may include image data. The selectively performing at least one operation may include performing at least one of selecting, modifying, adding, or removing data or metadata responsive to the determined at least one condition associated with the content. The storing the representation associated with the content includes storing the representation at a database and further includes mapping the representation to at least one message or condition. The at least one message or condition may be referenced in real-time while monitoring communications received from at least one client device. The content of at least one message of the monitored communications may be modified based at least in part upon the at least one message or content conditional parameter.

According to a still further aspect, provided is a computer-implemented method for providing conditional message content in a messaging system. The method includes receiving a message, examining the received message to determine content of the received message, selectively extracting at least one feature of the content of the received message, storing a representation associated with the content, associating at least a portion of the content with at least one set of data or metadata, determining at least one condition associated with one or more of the content or the at least one set of data or metadata, and selectively performing at least one operation on the content of the message based at least in part upon the determined at least one condition.

The receiving the message includes receiving the message from a first client device at an application server, and further includes monitoring messaging between the first client device and a second client device to collect contextual data related to the content. The selectively performing at least one operation includes performing at least one of selecting, modifying, adding, or removing data or metadata responsive to the determined at least one condition associated with the content. The storing the representation associated with the content includes storing the representation at a database and further includes mapping the representation to at least one message or condition.

Numerous other objects, features, and advantages of the present invention will be readily apparent to those skilled in the art upon a reading of the following disclosure when taken in conjunction with the accompanying drawings.

BRIEF DESCRIPTION OF THE DRAWINGS

The aspects of the present disclosure are best understood from the detailed description when read in relation to the accompanying drawings. The drawings illustrate a variety of different aspects, features, and embodiments of the disclosure, as such it is understood that the illustrated embodiments are merely representative and not exhaustive in scope. The disclosure will now be described with reference to the accompanying drawings, wherein like numbers refer to like elements.

FIGS. 3A-3D illustrate several components of a distributed datastore in accordance with at least one embodiment.

FIG. 4 illustrates several components of a messaging client device in accordance with one embodiment.

FIG. 21 illustrates side by side screenshots of a sender mobile messaging device and a recipient mobile messaging device exchanging real-time messages with embedded linkable emoji in accordance with one embodiment.

FIG. 22 illustrates side by side screenshots of a sender mobile messaging device and a recipient mobile messaging device to share a content link associated with an embedded linkable emoji sent in a real-time message in accordance with one embodiment.

FIG. 23 illustrates side by side screenshots of a sender mobile messaging device and a recipient mobile messaging device to share content associated with an embedded linkable emoji sent in a real-time message in accordance with one embodiment.

DETAILED DESCRIPTION

Figure 1:
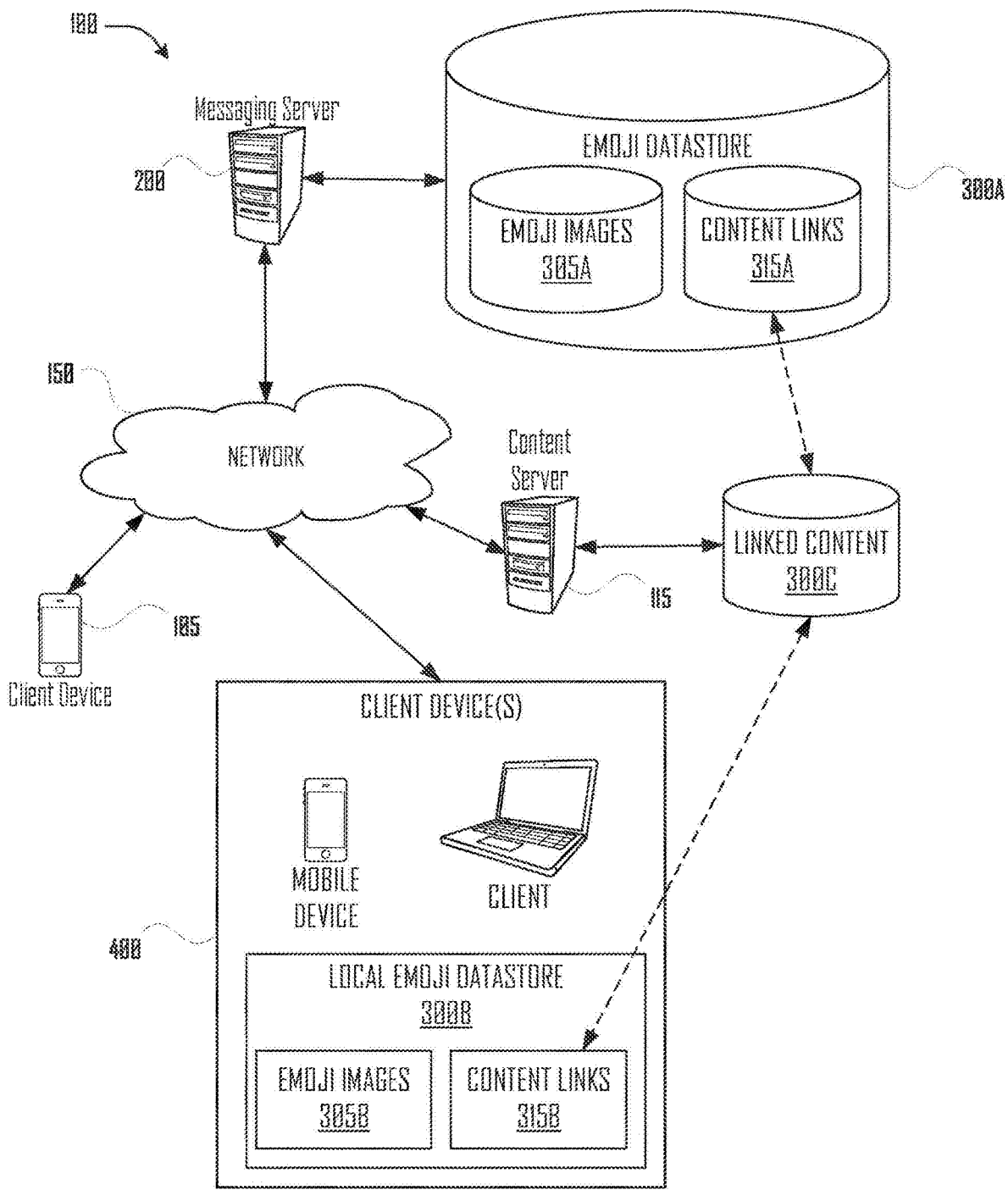
FIG. 1 illustrates a suitable real-time messaging environment wherein messages that include hyperlinked icons, images, and/or emoji may be shared between different client devices in accordance with at least one embodiment.

In accordance with various embodiments of the disclosure, clickable emoji messaging systems and methods are described that overcome the previously described disadvantages of the heretofore-known messaging methods and systems of this general type and that provide for icons, images, and emoji hyperlinked to additional content in a real-time messaging environment. More specifically, the described embodiments provide linkable emoji in messages sent on a real-time messaging platform, each linkable emoji includes an emoji image or text pattern for direct insertion into the message and at least one content link to selectively direct a mobile browser to additional content associated with each linkable emoji. Linkable emoji represent a new messaging language that shortens and improves communication between sender and recipient. Often a user may not know how to spell a desired target, but recognize the logo associated with a business or product. The linkable emoji allow the user to deploy logos and symbols to communicate. New linkable emoji may both be organically distributed and/or shared via sponsored distribution. The messaging system collects multiple types of logs and contextual data from participating client devices and content providers to deliver useful analytics include social metrics or parameters based on corresponding users, a particular emoji, link, and corresponding content. In fact, the described clickable emoji messaging system can selectively and/or conditionally designate a link and thereby content, based in part on collected client device information. Care is taken to validate collected analytics, as many modern messaging systems are also installed on mobile electronic devices, such as smartphones, that have a variety of connection options and/or use multiple connection methods (e.g., cellular, spread spectrum, radio, microwave, WiMAX and the like) to connect to the network and can skew collected data depending on which connection type is used. Moreover, as the clickable emoji messaging system interacts with dynamic web-based content, the traditionally static message must also consider the conditional spoliation of the message (e.g., a conditional and/or contextual parameter). In some embodiments, the linked content associated with the linkable emoji may only be conditionally available. For example, the linked content may only be downloadable for by a specific target user, at a specific time period, near a specific location, when a specific condition exists, for a specific number of or some combination of these spoliation factors. As used herein, the term content, as used in the context of at least a portion of a message, may refer, without limitation, to text data, image data, video data, audio data, multimedia data, metadata relating to text data, image data, audio data, multimedia data, or any other set of data or information, or combination thereof. Linked content as used herein may be associated with the linkable emoji may only be conditionally available (e.g., in accordance with one or more conditional parameters in various embodiments).

In the following detailed description, reference is made to the accompanying drawings which form a part hereof wherein like numerals designate like parts throughout, and in which are shown, by way of illustration, specific embodiments in which the disclosure may be practiced. Various aspects of the illustrative embodiments will be described using terms commonly employed by those skilled in the art to convey the substance of their work to others skilled in the art. However, the embodiments described herein may be practiced with only some of the described aspects. For purposes of explanation, specific numbers, materials, and configurations may be set forth to provide a thorough understanding of the illustrative embodiments. However, the embodiments described herein may be practiced without the specific details. In other instances, well-known features are omitted or simplified in order not to obscure the illustrative embodiments. Further, various operations and/or communications may be described as multiple discrete operations and/or communications, in turn, in a manner that may be helpful in understanding the embodiments described herein; however, the order of description should not be construed as to imply that these operations and/or communications are necessarily order dependent. In particular, these operations and/or communications need not be performed in the order of presentation.

The detailed description that follows is represented largely in terms of processes and symbolic representations of operations by conventional computing components, including a processor, memory storage devices for the processor, connected display devices and input devices. Furthermore, these processes and operations may utilize conventional computing components in a distributed computing environment; including remote file servers, servers, publishing resources, and/or memory storage devices. Each of these conventional distributed computing components is accessible by the processor via a network. In a distributed computing environment, clients, servers, and client/servers may be, for example, smartphones, mainframes, minicomputers, workstations, or personal computers. Most services in a distributed computing environment can be grouped into distributed file system, distributed computing resources, and messaging. A distributed file system provides a client with transparent access to part of the mass storage of a remote network device, such as a server. Distributed computing resources provide a client with access to computational or processing power of remote network devices, such as a cloud server. Messaging allow a client to manage the exchange of data and information between other device connected to the network. It is to be understood that other embodiments may be utilized and structural or logical changes may be made without departing from the scope of the present disclosure. Therefore, the following detailed description is not to be taken in a limiting sense, and the scope of a portion of the present disclosure is defined by the claims and appended drawings and their equivalents.

Throughout the specification and drawings, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure, but are not necessarily included on all embodiments of the disclosure. The meaning of "in" may include "in" and "on." The phrases "in one embodiment" or "in an embodiment" or "in various embodiments" or "in some embodiments" and the like are used repeatedly. Such phrases in various places in the specification do not necessarily all refer to the same embodiment, but it may unless the context dictates otherwise. The terms "emoji", "icon", "emoticon", and "thumbnail image" may or may not be used interchangeably depending on context and typically refer to either a text pattern, a graphical symbol, and/or pictogram readily recognized as having some well-known significance or embodying certain qualities through literal or figurative meaning. In particular, the word emoji literally means "picture" (e)+"letter" (moji), or a "text pattern" as referenced in various places in the specification, however; in this description the "emoji" term, without additional context, may also often refer to an image/pictogram embodiment of the text pattern. The term "clickable" or "linkable" may or may not be used interchangeably depending on context, and generally mean that a particular item may also designate a hyperlink or connection to additional content that is typically stored remotely, but may in some custom cases alternatively be found locally. The term "connected" or "coupled" can mean a direct connection between items, an indirect connection through one or more intermediaries, or communication between items in a manner that may not constitute a direct mechanical, systematic, physical, or other connection between the items connected. For example, in various embodiments component devices may be connected via a wireless connection that may allow for the exchange of data and/or information between the participating devices. The terms "consumer", "customer", "client" and "user" may or may not be used interchangeably depending on context. The terms "remote" and "local" generally are not interchangeable and specifically reference to two distinct devices, but may not necessarily describe relative proximity depending on context. For example, items may be stored on a local client datastore and a remote server datastore, but the local datastore may actually be farther away if the local client datastore is actually maintained in cloud storage associated with the client. Social metrics or parameters as used herein may include click counts, share counts, user preference counts, visit durations, user locations, and other social data that may be obtained from data aggregated from various combinations of client devices, social network servers, messaging servers, and content servers.

Reference is now made in detail to the description of the embodiments as illustrated in the drawings. Particular embodiments described in this application provide specific case implementations of messaging systems with clickable emoji, each emoji being linked to additional content available to the recipient upon selection. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Referring to FIG. 1, a suitable real-time messaging environment 100 is shown wherein messages that include hyper-linked icons, images, and/or emoji may be shared between different client devices (105, 400) in accordance with at least one embodiment. In the environment 100, network 150 connects client device 105, content server 115 with linked content datastore 300C, messaging server 200 with emoji datastore 300A, and originating client device(s) 400 with a local emoji datastore 300B. In one embodiment, the emoji datastore 300A includes emoji images 3005A and content links 315A. In one embodiment the local emoji datastore 300B on the client device 400 include emoji images 305B and content links 315B. Additional features of the distributed emoji datastore 300 are shown in greater detail in FIG. 4 below. In various embodiments, network 150 may include the Internet, a local area network ("LAN"), a wide area network ("WAN"), a wireless data network, a cellular data network, and/or other data network. More specifically, the cellular data network can relate to 3GPP/3GPP2 Radio Technologies like 2G (GSM/GPRS); 3G (UMTS/HSPA/CDMA); and 4G (LTE/HSPA+). Similarly, the wireless data network may include microwave data networks and/or other wireless technologies including WiFi (IEEE 802.11x), NFC, location, and Bluetooth. Moreover, it is understood by those of skill in the art that the communication network 150 includes any combination of the above.

In some embodiments, other servers and/or devices (not shown) may also be present. For example, in many embodiments, multiple additional client devices and/or non-client devices may be present. Similarly, in many embodiments, multiple content publishers may also be present. In some embodiments, one or more intermediary application servers and/or platform-provider servers may also be present.

Figure 2:
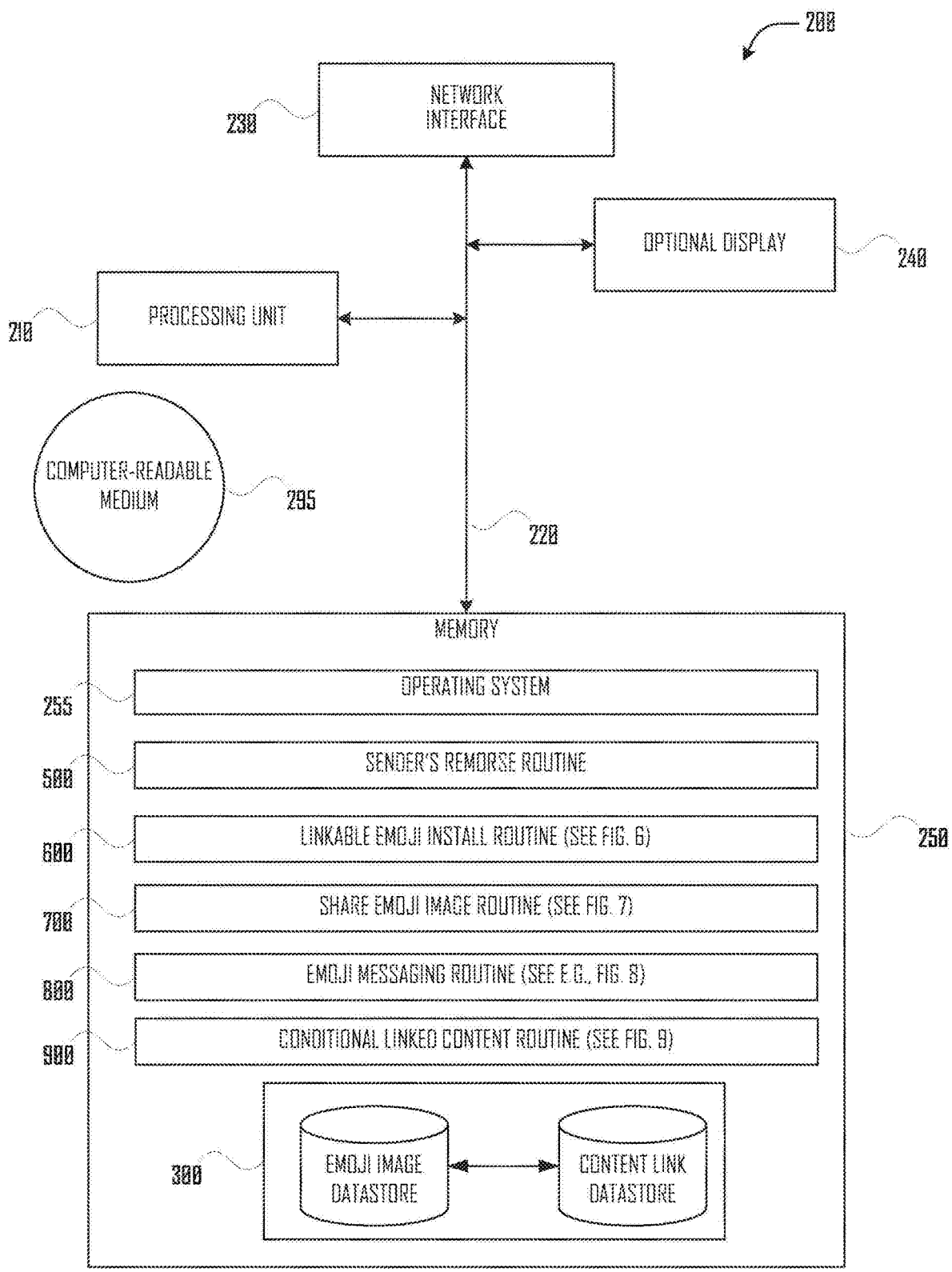
FIG. 2 illustrates several components of a messaging server in accordance with one embodiment.

Referring now to FIG. 2, several components of a messaging server 200 with access to an emoji datastore 300 are shown in accordance with one embodiment. As shown in FIG. 2, the messaging server 200 includes a network communication interface 230 for connecting to the communication network 150. The messaging server 200 also includes one or more processors collectively represented as a processing unit 210, memory 250, and an optional display interface 240, all interconnected along with the network interface 230 via a communication bus 220. The memory 250 generally comprises a random-access memory ("RAM"), a read only memory ("ROM"), and a permanent mass storage device, such as a disk drive, flash device, or the like. The memory 250 stores program code for a number of applications, which includes executable instructions for sender's remorse routine 500, linkable emoji install routine 600 (see FIG. 6, discussed below), share emoji image routine 700 (see FIG. 7, discussed below), emoji messaging routine 800 (see e.g., FIG. 8, discussed below), and conditional linked content routine 900 (see FIG. 9, discussed below). The sender's remorse routine 500 allows a user, within a designated time period, to retract, delete, and or modify a previously sent message. In one embodiment, the remorse routine 500 generates an opt-out pop-up message that allows a previously sent message to be cancelled and/or modified within a limited time. In one embodiment, the allowed time corresponds to the delay while the message is being sent via the message server to the recipient device. In one embodiment, during the send process, the emoji image is checked against a registered database of images. If a matching image is found, but the emoji content link does not match the saved link, a substitute link is suggested to the user. Other embodiments optionally allow for message validation, texting spellcheck, and other message modifications to occur after the message is sent by the sending client device, but prior to the message being delivered to the recipient client device. As may be expected, client devices may deploy multiple messaging routines on the same device. Each of these messaging applications may handle linkable emoji differently. For example, in one embodiment, the linkable emoji includes a link to content that is stored remotely from the receiving client device. While another embodiment sends the actual content with the emoji message so it is immediately available. As shown in FIG. 2, the emoji datastore 300 includes an emoji image datastore connected to a content link datastore. In one embodiment, emoji datastore 300 also includes linked content. Accordingly, each emoji stored in the datastore is linkable to content. In one embodiment, the emoji datastore 300 is distributed within the environment 100 (see FIG. 3, discussed below). In addition, the memory 250 also stores an operating system 255. These software components may be loaded from a computer readable storage medium 295 into memory 250 of the messaging server 200 using a read mechanism (not shown) associated with a non-transient computer readable storage medium 295, such as a floppy disc, tape, DVD/CD-ROM drive, memory card, or the like. In some embodiments, software components may also be loaded via the network communication interface 230, rather than via a computer readable storage medium 295. In some embodiments, the messaging server 200 may include many more components than those shown in FIG. 2. However, it is not necessary that all of these generally conventional components be shown in order to disclose an illustrative embodiment.

Although a particular messaging server 200 has been described that generally conforms to conventional general purpose computing devices, the messaging server 200 may be any of a great number of network devices capable of communicating with the communications network 150 and obtaining applications, for example, mainframes, minicomputers, workstations, personal computers, or any other suitable computing device. In some embodiments, some or all of the systems and methods disclosed herein may also be applicable to distributed network devices, such as cloud computing, and the like. Available cloud resources may include applications, processing units, databases, and file services. In this manner, the messaging server 200 enables convenient, on-demand network access to a shared pool of configurable linkable emoji share, search, promotion, recommendation, spoliation, install, storage and messaging related computing services and resources (e.g., networks, servers, storage, applications, and services) that can be rapidly provisioned and released with minimal management effort or service provider interaction. These services may be configured so that any computer connected to the communications network 150 is potentially connected to the group of linkable emoji applications, processing units, databases, and files or at the very least is able to submit emoji search requests, linkable emoji message selections, and/or linked content designation. In this manner, the data maintained by messaging server 200 and/or emoji datastore 300 may be accessible in a variety of ways by various client messaging devices 105 and client devices 400, for example, a digital tablet, a personal computer, a portable scanner, a handheld computer, a cell phone, or any other device that is capable of accessing the communication network 150.

Referring now to FIGS. 3A-3D, several components of a distributed datastore 300 are shown in accordance with at least one embodiment. More specifically, FIG. 3A includes one portion of the distributed datastore 300 providing an emoji datastore 300A. In one embodiment, the emoji datastore 300A is managed and maintained by the messaging server 200. The emoji datastore 300A includes portions dedicated to a library database of emoji images 305A, a library database of emoji text pattern links 310, library databases of content 390A and related links 315A, emoji identification information 320, a cross-linked database of emoji categories 325, and a cross-linked database of emoji attributes 330.

FIG. 3B includes one portion of the distributed datastore 300 providing a local emoji datastore 300B. In one embodiment, the local emoji datastore 300B is managed and maintained by the client device 400. The emoji datastore 300B includes portions dedicated to a library database of shared emoji images 305B, a library database of local emoji images 380, a library database of content links 315B, and a cross-linked library database of local content 390B. In one embodiment, the client device 400 may identify and/or create new emoji and subsequently link the emoji to content. Upon authorization of the user and approval of the messaging administrators, one embodiment allows the local linkable emoji to be uploaded to the emoji datastore 300A for general distribution. Moreover, in one embodiment, the shared image library 305B and content link library 315B on the user device 400 may be periodically updated by the messaging server 200.

FIG. 3C includes one portion of the distributed datastore 300 providing a linked content datastore 300C. In one embodiment, the linked content datastore 300C is managed and maintained by the content server 115. The linked content datastore 300C includes portions dedicated to a library database of content 390B and a library database of content links 315C.

FIG. 3D includes one portion of the distributed datastore 300 providing an emoji analytics datastore 300D. In one embodiment, the emoji analytics datastore 300D is managed and maintained by the messaging server 200. In yet another embodiment, the emoji analytics datastore 300D is distributed across the messaging server 200, the client devices (105,400), and the content server 115. The emoji analytics datastore 300D includes portions dedicated to a database of content analytics 390D, a database of link analytics 315D, user analytics 393, and device analytics 395. For example, the emoji analytics datastore 300D may aggregate various social metrics or parameters among other collected analytic information, such as click counts, share counts, user preference counts, visit durations, user locations, gender, age, origination/destination message and device information, and other similar social data that may be obtained from data aggregated from various combinations of client devices, social network servers, messaging servers, and content servers. These analytics may be used to demonstrated click-through rates and vitality of various linkable emoji that are associated with commercial content. Accordingly, this information may indicate desirable timing to update the link associated with a particular emoji to point to different content. The emoji analytics datastore 300D includes portions dedicated to identifying emoji and content interdependencies according to image search target results, social metrics or parameters, emoji attributes, emoji source information, spoliation parameters and other categories that help define existing interdependencies between particular content that can be observed, collected, or documented relative to a set of emoji images (e.g., including or defined as conditional parameters in various embodiments).

Referring now to FIG. 4, several components of a messaging client device 400 in accordance with one embodiment. As shown in FIG. 4, the client device 400 includes a network communication interface 430 for connecting to the communication network 150. The client device 400 also includes one or more processors collectively represented as a processing unit 410 interconnected via a communication bus 420 with memory 450, optional touchscreen display interface 440, optional keyboard 460, and the network interface 430. The memory 450 often includes some combination of random-access memory ("RAM"), read only memory ("ROM"), and a permanent mass storage device, such as a disk drive, flash device, or the like. The memory 450 stores program code for a number of applications, which includes executable instructions for emoji messaging routine 1000 (see FIG. 10, discussed below), local emoji creation routine 1100 (see FIG. 11, discussed below), local linkable emoji distribution routine 1200 (see FIG. 12, discussed below), and local content routine 1300 (see FIG. 13, discussed below). In addition, the memory 450 also stores an operating system 455, which includes a native keyboard and/or touchscreen keypad driver 465A. As shown in FIG. 4, the local datastore 470 includes portions dedicated to a shared emoji image datastore 405, a local emoji image datastore 480, and local content datastore 490. Each portion of the local datastore 470 connected to a content link datastore 415, which may include both local links and shared global links to content associated with each emoji. Accordingly, each emoji, shared or local, that is stored in the datastore is linkable via the content link datastore 415 to content. These software components may be loaded from a computer readable storage medium 495 into memory 450 of the client device 400 using a read mechanism (not shown) associated with a non-transient computer readable storage medium 495, such as a floppy disc, tape, DVD/CD-ROM drive, memory card, I/O port, or the like. In some embodiments, software components may also be loaded via the network communication interface 430, rather than via a computer readable storage medium 495. In some embodiments, the client device 400 may include many more components than those shown in FIG. 4. However, it is not necessary that all of these generally conventional components be shown in order to disclose an illustrative embodiment.

Figure 19:
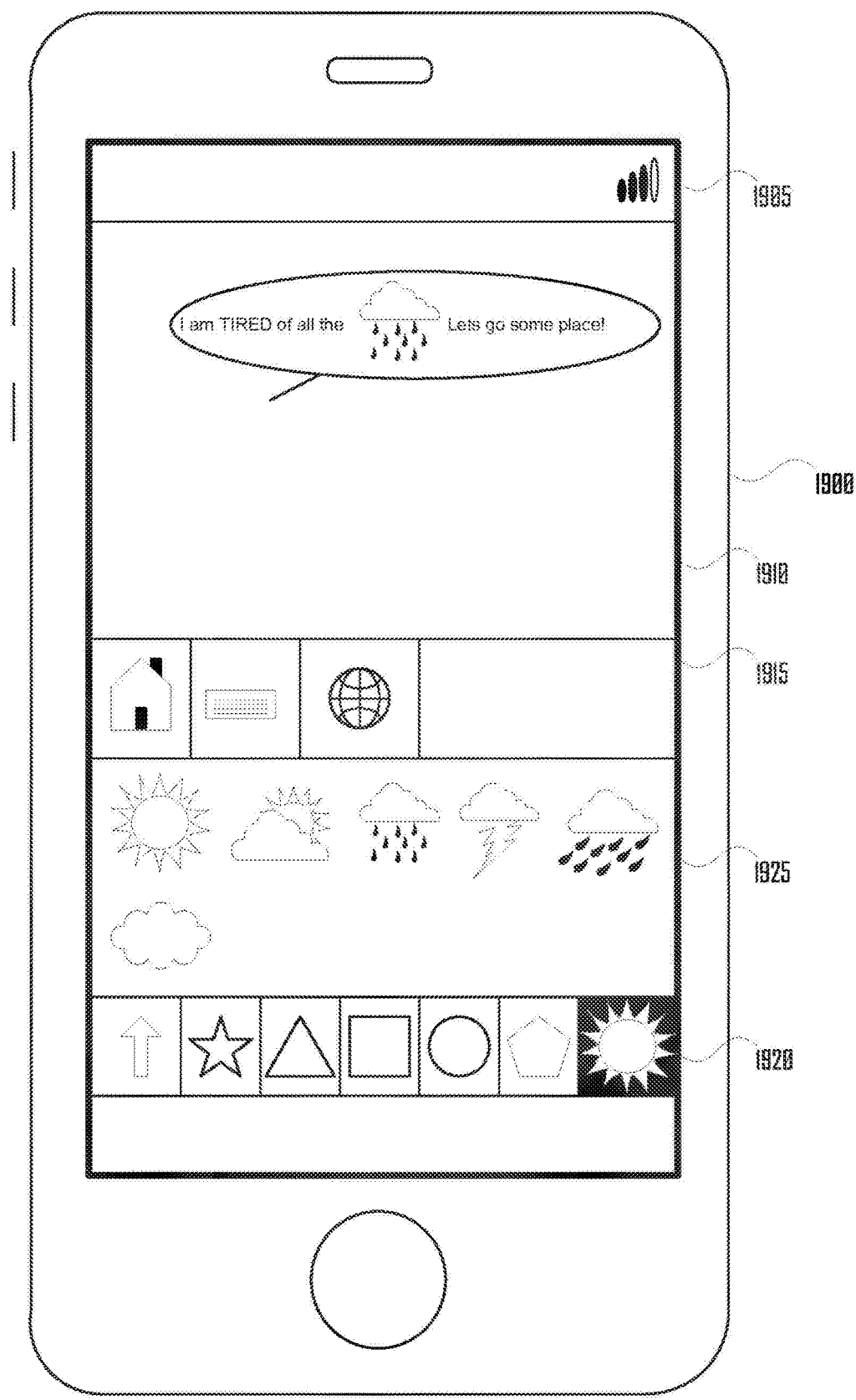
FIG. 19 illustrates a screenshot of a mobile messaging device with a library of related linkable weather emoji accessed to prepare a real-time message with an embedded linkable emoji in accordance with one embodiment.

In one embodiment, the client device 400 optionally includes a linkable emoji messaging application keyboard and/or keypad driver 465B to supplement and/or replace the native keyboard and/or touchscreen keypad driver 465A of the operating system 455. For example, some operating systems strictly control access to the keyboard driver, effectively preventing addition of new keys or libraries to any native digital keyboard. In these cases, linkable emoji functionality may still be achieved on the target device via a supplemental messaging application keyboard and/or keypad driver 465B to the native digital keyboard driver 465A of the device. Depending on the operating system 455, the linkable emoji messaging application keyboard driver 465B may be maintained as a universal standalone driver or only become active when designated applications are running on the client device. Various embodiments of the linkable emoji digital keyboard are shown in greater detail in FIGS. 19-21. In particular, FIG. 19 shows a screenshot of a mobile messaging device 1900 with a status bar 1905, a communication panel 1910, and a digital keyboard. The digital keyboard includes an application taskbar 1915, a collection library bar 1920 of related groups of linkable emoji, and a selection panel 1925. Above the collection library bar 1920 is the selection panel 1925 of available linkable emoji. As the weather collection is designated in the collection library bar 1920, available linkable emoji for weather conditions are shown. The collection library bar 1920 and selection panel 1925 may both be accessed to prepare a real-time message shown in communication panel 1910. Accordingly, a message with an embedded linkable emoji is shown in accordance with one embodiment. Depending on the parameters of the linkable emoji, the message might send an interested user to related weather forecast content, related weather news content, appropriate weather gear/clothing content, and other similar weather content. Alternatively, the user may designate custom content to better express their feelings to the recipient. Moreover, the user may also decide to designate various spoliation parameters including a weather dependent expiration if weather conditions change (e.g., as one or more conditional parameters). This may be particularly useful if the proposed activity is weather dependent.

Figure 20:
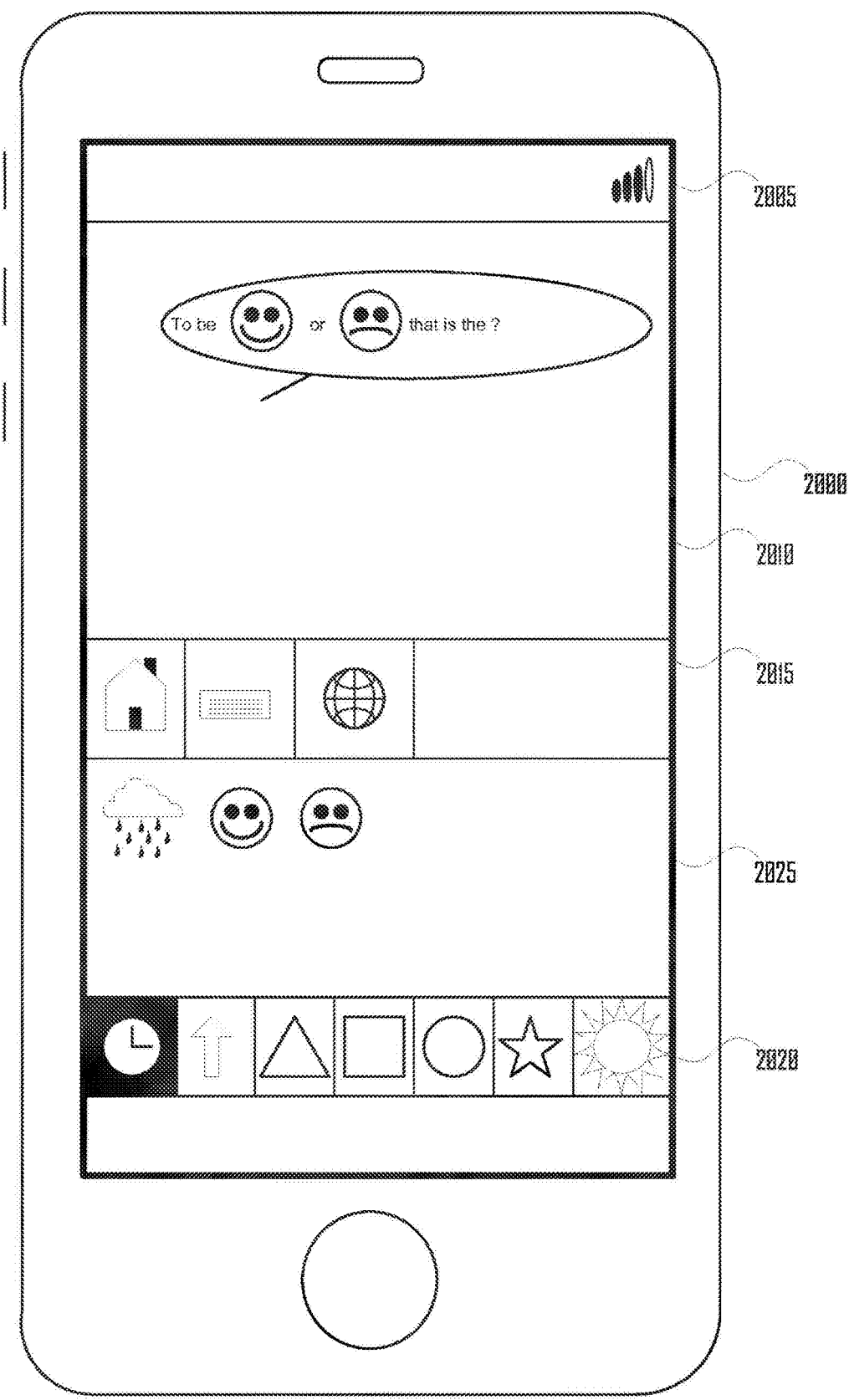
FIG. 20 a screenshot of a mobile messaging device with a library of recently used linkable emoji accessed to prepare a real-time message with multiple embedded linkable emoji in accordance with one embodiment.

Referring now to FIG. 20, a screenshot of a mobile messaging device 2000 shows a status bar 2005, a communication panel 2010, and a digital keyboard that includes an application taskbar 2015, a collection library bar 2020, and a selection panel 2025. The collection library bar 2020 designates recently used linkable emoji, which are shown in the selection panel 2025. In accordance with one embodiment, a real-time message with multiple embedded linkable emoji is shown in communication panel 2010.

Referring now to FIG. 21, side by side screenshots show a sender mobile messaging device 2105 and a recipient mobile messaging device 2110 exchanging real-time messages with embedded linkable emoji in accordance with one embodiment. The sender mobile messaging device 2105 shows a communication panel with a chronological history of communications and a category search field 2115A. The category search field 2115A designates "RESTAURANT EMOJI" and three linkable emoji options (Linkable Emoji-A, Linkable Emoji-B, and Linkable Emoji-C) are suggested for addition to the message. These restaurant choices may be a result of user activity, geographic proximity, ratings, sponsorship, or other categorical search metric. Moreover, the additional search results may be accessed using traditional touchscreen browsing tools, such as result scrolling (up/down) and swipe rotation (left/right). If a suitable linkable emoji is not found, the user may also add a new emoji with the add button 2120. The recipient mobile messaging device 2110 also shows a communication panel with a chronological history of communications, but uses a keyboard search field 2115B instead. The recipient designates "RESTAURANT Z" and a corresponding Linkable Emoji-Z is added as an alternative suggestion to the messaging conversation. If the search term was not found, one embodiment would request the user to add an emoji for the requested search target. Thus, if "Restaurant Z" was not available in the emoji datastore 300, the recipient user could create a new emoji by designating an image and a URL link to the restaurant. Even if a text search is used, a categorical response may be supplied. For example, if the recipient designates "cars" a series of logos for different automobile makers might be presented. Similarly, music may result in a list of artists, bands, recordings, performances, and/or stores. In one embodiment, emoji are suggested to the user based on the context of the message. Another embodiment allows the user to designate what type of link is associated with a particular emoji image. For example, a user may prefer purchase links to information links.

Figure 5:
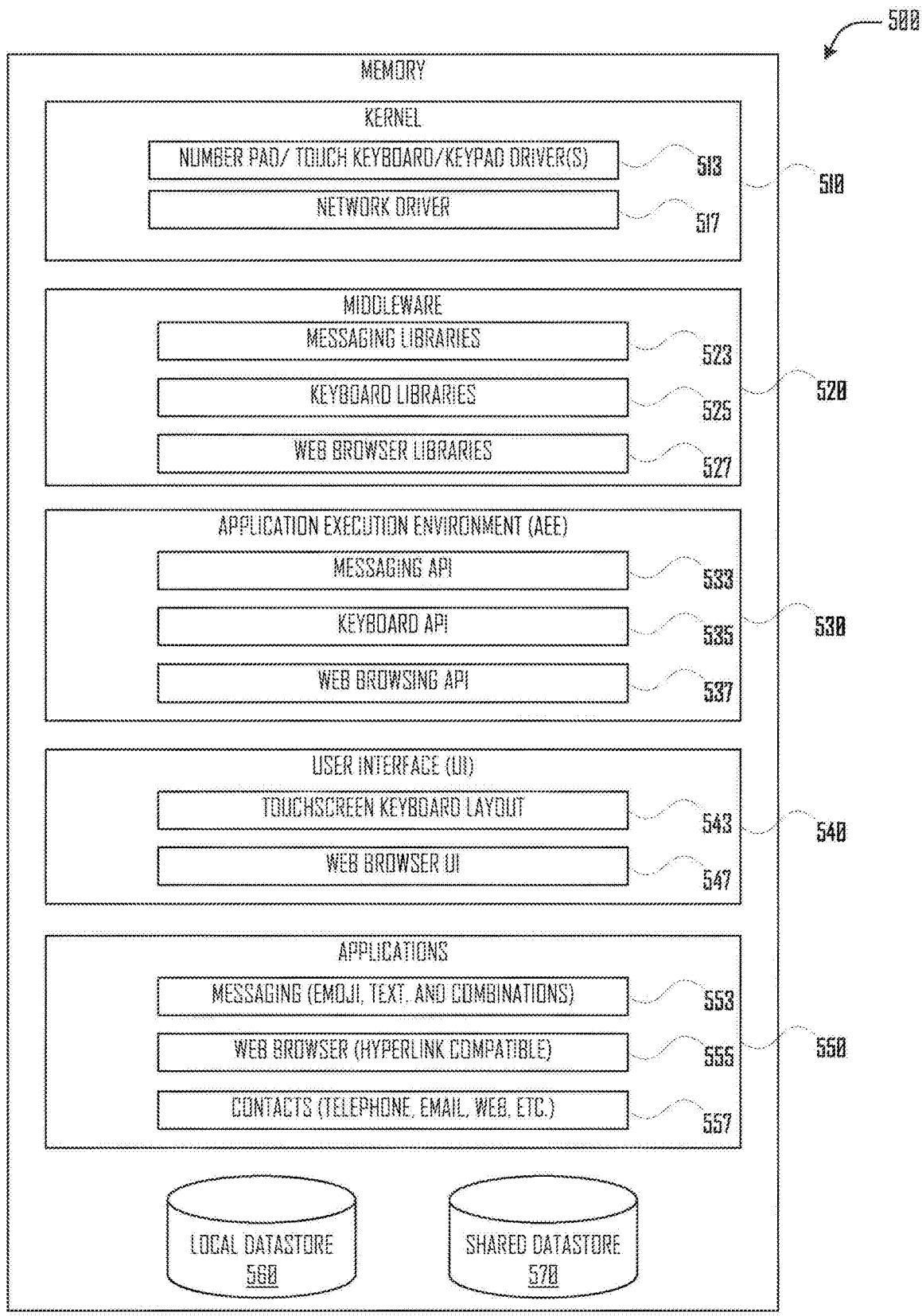
FIG. 5 illustrates several software components of a messaging client device shown in FIG. 4 in accordance with one embodiment.

Referring now to FIG. 5, several software components of a mobile messaging client device 500 are shown in accordance with one embodiment. The messaging client device 500 includes a kernel layer 510, a middleware layer 520, an application execution environment (AEE) layer 530, a user interface (UI) layer 540, applications 550, local datastore 560, and shared datastore 570. The kernel layer 510 provides management systems for processes and drivers for hardware on the mobile client device and may include number pad, touch screen keyboard, and keypad drivers 513 and a network driver 517 to connect to the network. The middleware layer 520 provides software libraries to applications running on the mobile client device and include messaging libraries 523, keyboard libraries 525, and web browser libraries 527. The AEE layer 530 provide application programming interfaces (API) to allow programs access to different components and software on the mobile client device and include a messaging API 533, a keyboard API 535, and a web browsing API 537. The user interface layer 540 provides the graphics and layouts seen on the display screen of the mobile client device and include touchscreen keyboard layouts 543 and web browser UI 547. The applications represent the programs that users of the mobile client device access and include messaging applications 553, web browsers 555, and contact applications 557. The messaging applications 553 may include instant messaging services, emoji compatible services, text-only services, and messaging applications offering a different combination of messaging services.

Figure 6:
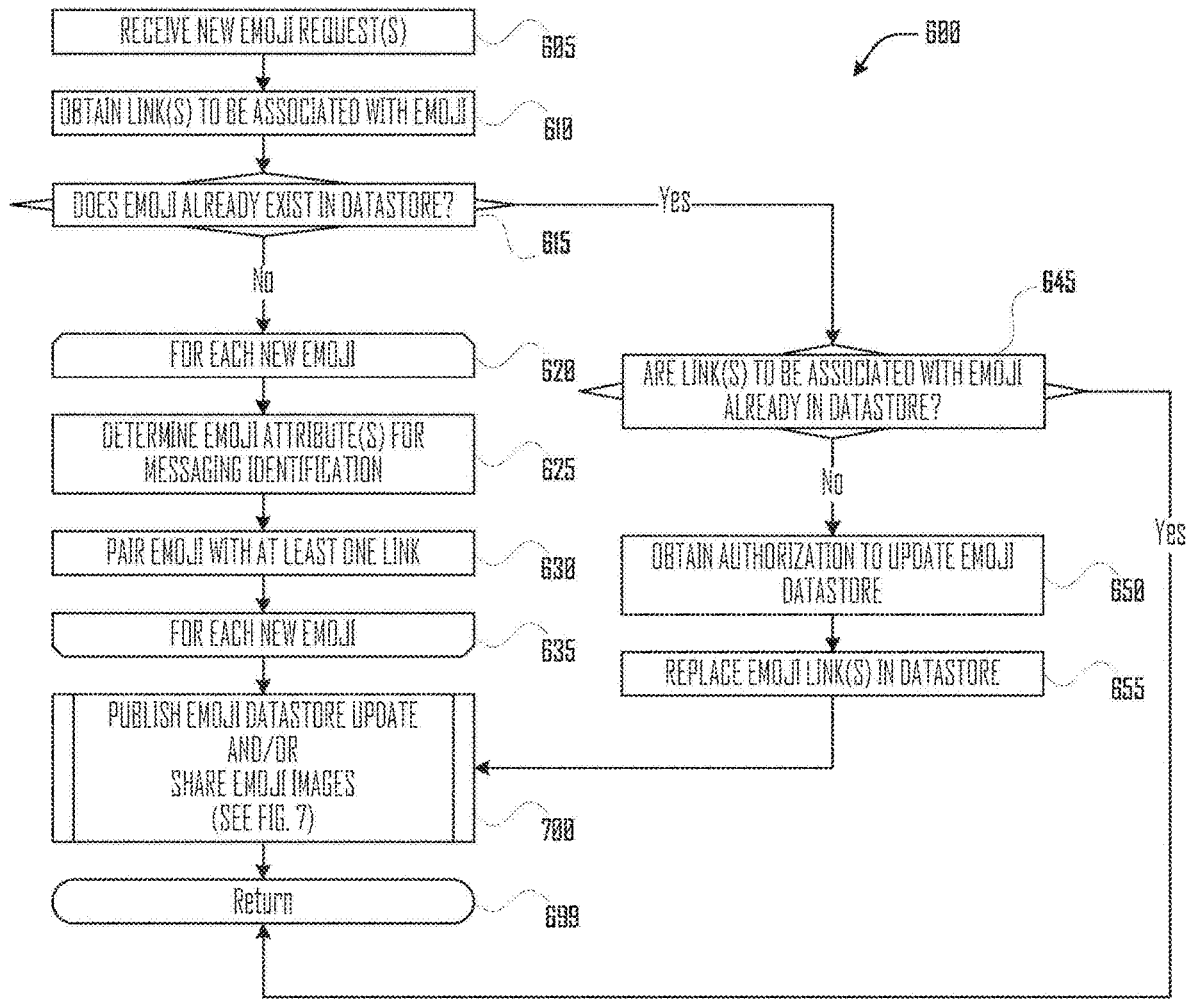
FIG. 6 illustrates a flow diagram of a linkable emoji install routine for the messaging server shown in FIG. 2 in accordance with one embodiment.

Referring now to FIG. 6, a flow diagram, in accordance with one embodiment, shows a linkable emoji install routine 600 for the messaging server 200 shown in FIG. 2. Once the messaging server 200 receives at least one request for a new linkable emoji, the linkable emoji install routine 600 begins in execution block 605. In one embodiment, a new emoji request includes an emoji image and optionally an emoji text pattern. The new emoji request may also include at least one link to associated content and/or the associated content. In execution block 610 the routine 600 obtains any remaining links to be associated with the emoji image and/or the emoji text pattern. This may include querying the messaging server or content server for the location of content. In query block 615, routine 600 determines whether the new emoji exists in the datastore. In one embodiment, routine 600 may query the datastore for the emoji image or emoji text pattern to determine whether it already exists. In yet another embodiment, the emoji link(s) are also queried.

If routine 600 determines that the new emoji does not already exist in the datastore, a new loop is started for each new emoji not found in the datastore in start loop block 620. For each new emoji, routine 600 determines emoji attributes for messaging identification in execution block 625. These emoji attributes may include emoji categories, image descriptions, text pattern, topical associations and descriptors, sponsorship affiliations, origination, distribution, spoliation parameters, and other attributes associated with the linkable emoji that may identify the emoji for insertion into a message. In execution block 630, the emoji image and/or text pattern are then paired with at least one link to additional content by routine 600. If another new emoji is still pending, then routine 600 starts a next loop at end loop block 635. Otherwise routine 600 submits the new linkable emoji for update publication in subroutine 700 (see FIG. 7, discussed below) and returns in termination block 699.

If routine 600 determines in query block 615 that the emoji already exists in the datastore, the routine 600 subsequently checks in query block 645 whether each of the link(s) associated with the new emoji are also in the datastore. If the same link(s) are found, routine 600 returns in termination block 699. Otherwise routine 600 obtains authorization in execution block 650 to update the links in the datastore that are currently associated with the existing linkable emoji with the new links. Upon authorization, routine 600 replaces the links in execution block 655 and submits the modified linkable emoji for update publication in subroutine 700 (see FIG. 7, discussed below) returns in termination block 699.

Figure 7:
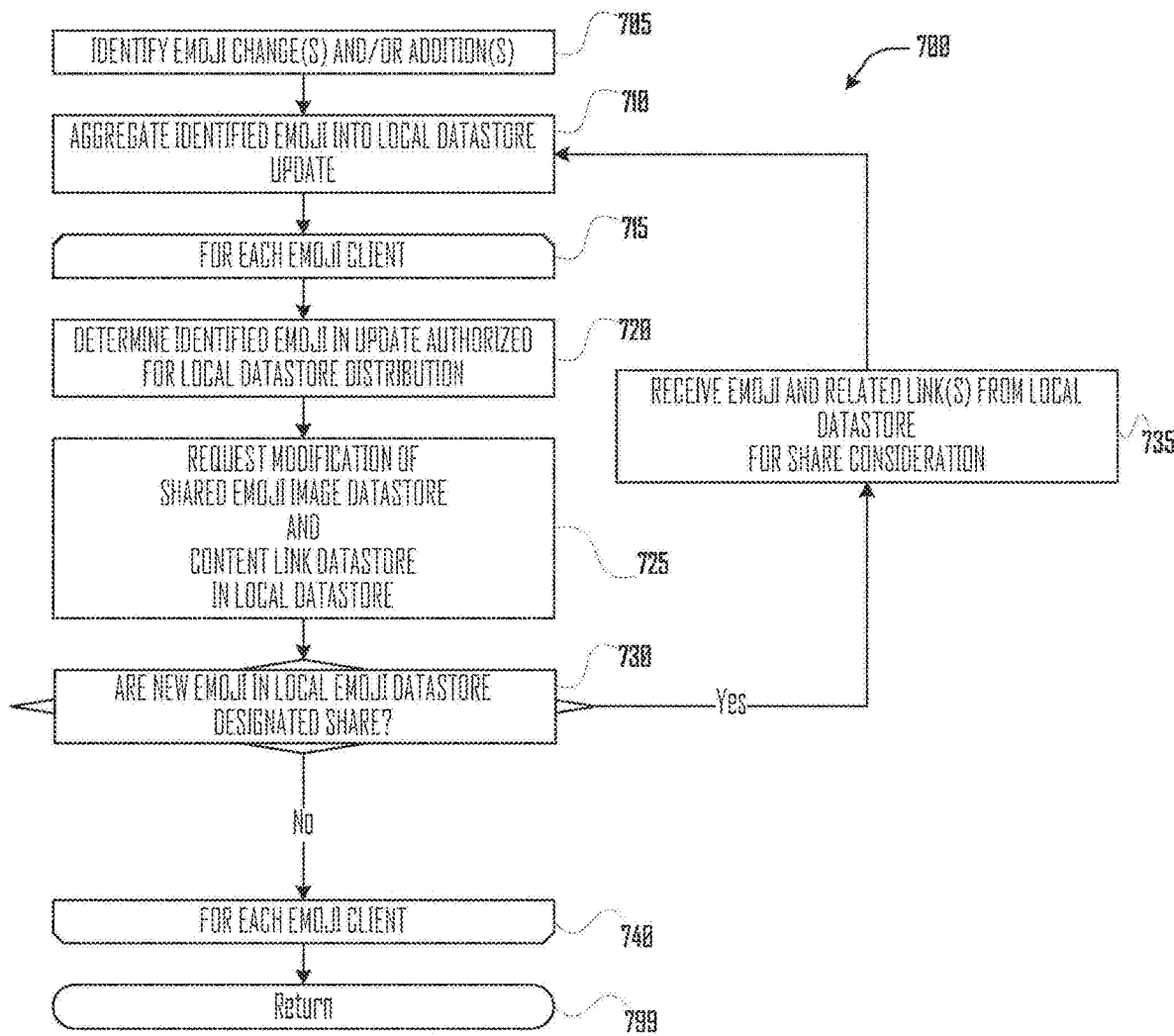
FIG. 7 illustrates a flow diagram of a publish/share emoji routine for the messaging server shown in FIG. 2 in accordance with one embodiment.

Referring now to FIG. 7, a flow diagram shows a publish/share emoji routine 700 for the messaging server 200 in accordance with one embodiment. The publish/share routine 700 identifies emoji changes and/or additions in execution block 705. In one embodiment, changes are provided an input parameter for a subroutine call. Alternatively, each new emoji or emoji modification may simply be added to an update table that is periodically reviewed and upon approval published into the main emoji datastore. Generally, a new emoji will first be submitted for administrative approval before being added to the emoji datastore. However, alternative methods, such as local creation, adoption, and sharing may also result in an emoji being considered for addition to the emoji datastore.

Once the changes and additions are identified, routine 700 aggregates the identified emoji into an update for the local client datastores in execution block 710. In one embodiment, the local datastore update is periodically transmitted from the messaging server to the client device. The local datastore update may also be requested by the client device from the messaging server. In one embodiment, the messaging server shares a notification that an update is available and the client device selectively determines when to obtain the update. This particular process is beneficial for mobile client devices that may have different data rates depending on which connection type is being used. Accordingly, one embodiment only provides updates when a designated data connection type is available.

In one embodiment, routine 700 starts a loop for each client at start loop block 715 to update local datastore. More specifically, routine 700 determines for each client which emoji in the local datastore update are authorized for local datastore distribution. In one embodiment, this may be determined based on client settings and emoji settings. For example, a client device might identify that it is a child/minor account and adult themed emoji are restricted from download. Moreover, an emoji may have a geographic limitation that limits the potential client devices to those registered within a particular geographic area. The geographic data might be collected from a variety of sources including device area code information, recent logged GPS data, and other client device or user data. Other spoliation factors may be considered with respect to emoji similar to those spoliation factors used in messages (see e.g., FIG. 14 below). Once the portions of the local datastore update available to the client have been identified, routine 700 requests modification in execution block 725 of the shared emoji image datastore and content link datastore in the local datastore of the client device. In one embodiment, a user may designate automatic update on a user device. Additionally, in one embodiment, the messaging server may mandate a required update that potentially overrides user designations to the contrary on a client device. This allows the system to remove illegal emoji images and regulate the shared database to ensure compatibility with other client devices in the system. While interacting with the client device, routine 700 determines in query block 730 whether any new emoji in the local datastore of the client device are designated to be shared. If new emoji exist on the local datastore of the client device, routine 700 uploads the designated emoji for consideration to be shared/added to the emoji datastore in execution block 735. If the new emoji from the client device may be shared, routine 700 aggregates the new emoji in execution block 710 into the next local datastore update. In one embodiment, an update from a first client device may be shared and uploaded to the messaging server, prior to the update being sent to a second client device. If no new emoji are found in the local datastore on the client device, routine 700 moves to the next client device in end loop block 740. If there are no more client devices that require updates, routine 700 ends and returns in termination block 799.

Figure 8:
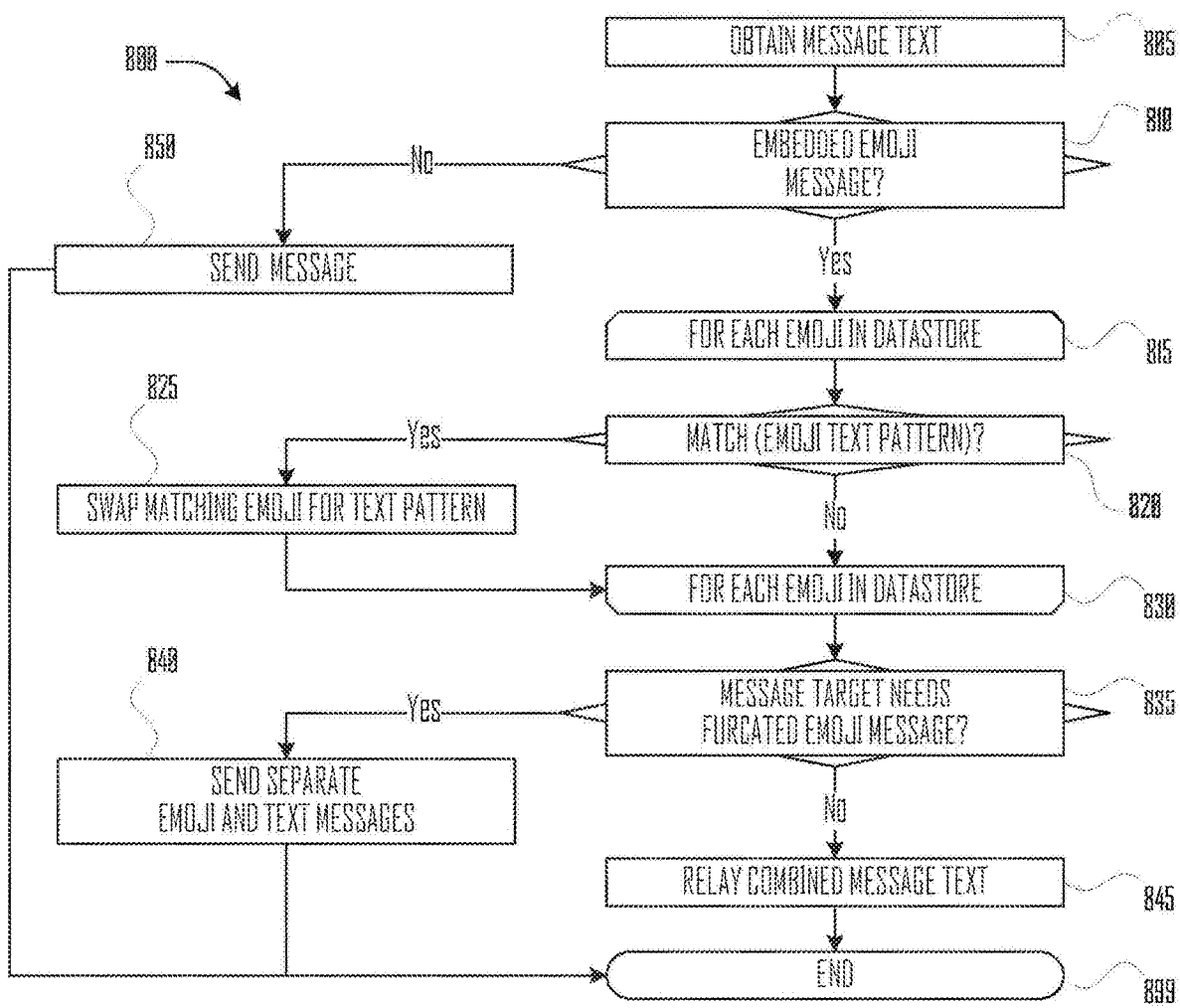
FIG. 8 illustrates a flow diagram of an embedded emoji message routine for the messaging server shown in FIG. 2 in accordance with one embodiment.

Referring now to FIG. 8, a flow diagram shows an embedded emoji message routine 800 for the messaging server 200 in accordance with one embodiment. Routine 800 obtains a message including message text in execution block 805. The message may optionally include an embedded emoji message and/or designate that an embedded emoji should be added to the message. In query block 810, routine 800 determines whether the message is an embedded emoji message. If the message is not an embedded emoji message, then the message is sent in execution block 850 and the routine 900 ends in termination block 899.

When an embedded message is sent, routine 800 begins a recursion in start loop block 815 to check the message against each emoji in the datastore. In query block 820, routine 800 checks for a match between characters in the message and the stored emoji text pattern. If a match is found, routine 800 swaps the matching emoji with the detected text pattern in execution block 825. In one embodiment, routine 800 inserts the identified emoji into the message. One embodiment parses a message after detection into text portions and emoji portions. Since in one embodiment there may still be more than one emoji in each message, routine 800 moves to the next emoji for detection in end loop block 830. If no match is found, routine 800 moves to the next emoji in end loop block 830. Once all of the emoji have been compared and the loop is complete, routine 800 determines in query block 835 whether the message target may only receive a furcated emoji message. In one embodiment, a furcated message separates text portions and emoji portions into separate messages and send them in execution block 840. In the case where multiple emoji are included in the message, the furcated message may include several text portions and several emoji portions. Each portion may be sent individually. Moreover, each portion may also be sent via different networks. For example, the text portion may use SMS, and the emoji may be sent using a cellular data connection or wireless (WiFi connection). If the target user device can receive linkable emoji, routine 800 relays the combine message text and emoji in execution block 845. Once the message has been sent, furcated or not, routine 800 ends in termination block 899.

Figure 9:
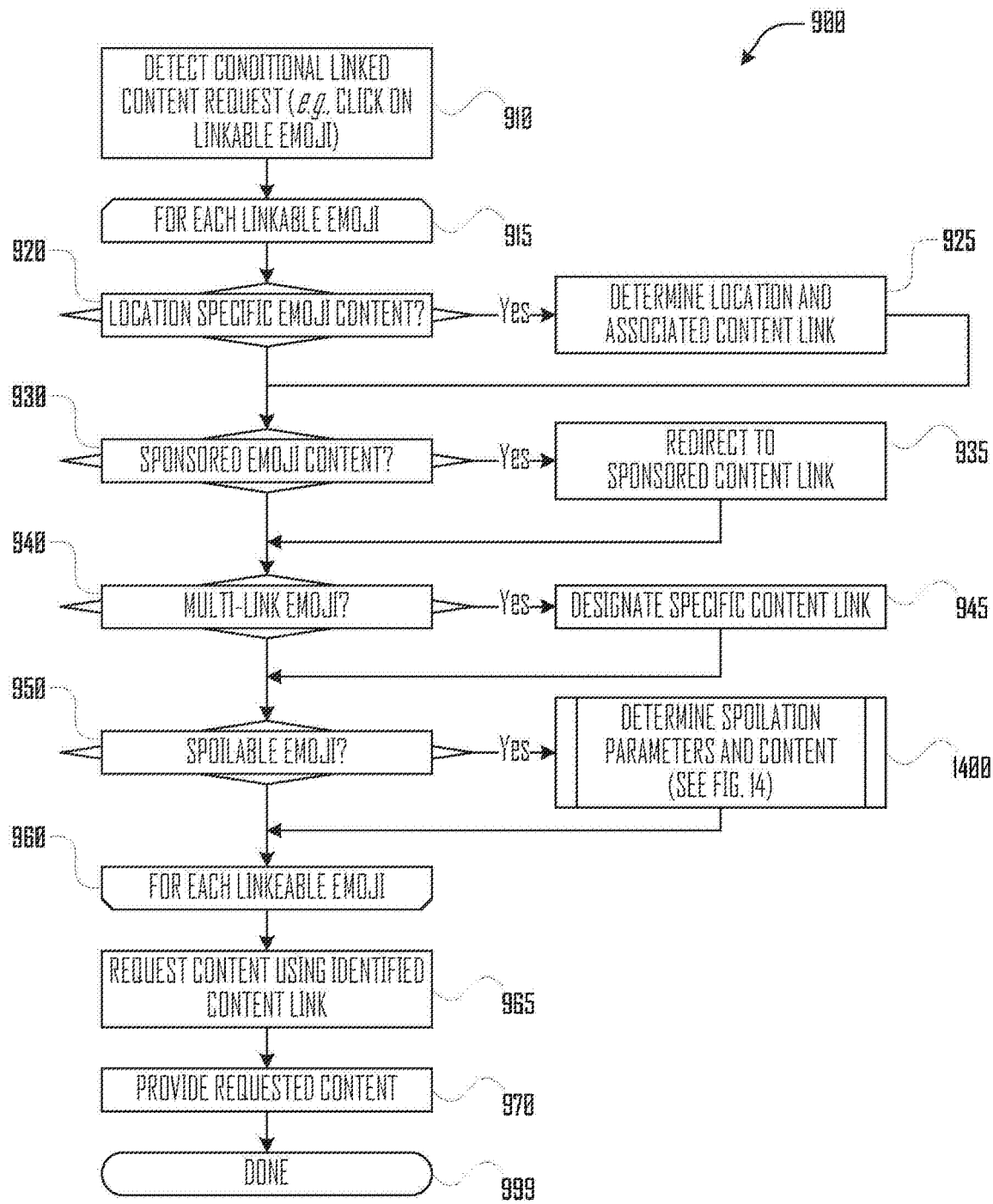
FIG. 9 illustrates a flow diagram of a conditional linked content routine for the messaging server shown in FIG. 2 in accordance with one embodiment.
Figure 25:
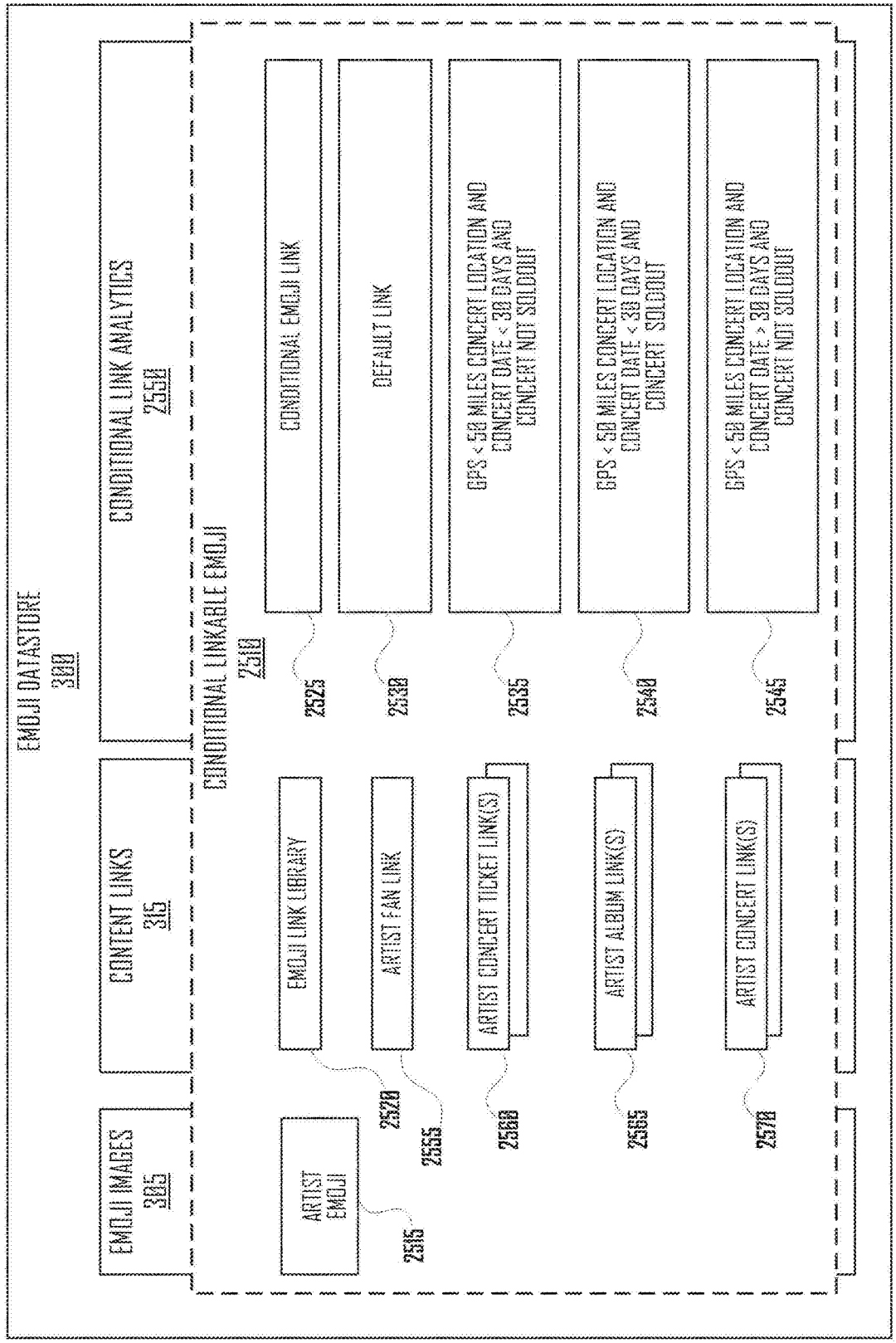
FIG. 25 illustrates several components of a conditional linkable emoji in an emoji datastore in accordance with at least one embodiment.

Referring now to FIG. 9, a flow diagram shows a conditional linked content routine 900 for the messaging server 200 in accordance with one embodiment. In one embodiment, a message may also include conditional content that may only be sent to the target if the designated conditions associated with the message or message components (e.g., conditional parameter(s)) are satisfied. In execution block 910, routine 900 detects a conditional linked content request. For example, a target user may click on a linkable emoji sent in a message. Upon detection, routine 900 starts for each linkable emoji selected a loop in start loop block 915. In first step of the loop, routine 900 determines whether there is location specific emoji content 920 in query block 920. If location specific content is found, routine 900 determines the location of the requesting user and provides the associated content based on the location of the requesting user in execution block 925. Next in query block 930, routine 900 determines whether there is sponsored emoji content associated with the linkable emoji. If the selected linkable emoji is a sponsored emoji, routine 900 redirects to the sponsored content link in execution block 935. In query block 940, routine 900 determines whether the linkable emoji include a multi-link emoji. If a multi-link emoji is present, routine 900 determines which link should be designated in execution block 945. One embodiment of a conditional multi-link emoji is shown in FIG. 25. In query block 950, routine 900 determines whether the message includes spoilable emoji. If the emoji is spoilable, routine 900 determines spoliation parameters and content in subroutine 1400 (see e.g., FIG. 14 below). Upon completing the query of conditions associated with each linkable emoji (e.g., conditional parameter(s)), routine 900 ends the loop in end loop block 960. I should be understood by those of skill in the art that other conditions may be checked by routine 900 and still remain within the scope of this disclosure. Moreover, the order of evaluation by routine 900 need not be exactly as illustrated. Once routine 900 has finished the conditional loop, the identified content link is used to request the associated content in execution block 965. Upon receipt of the requested content, routine 900 provides the requested content in execution block 970.

Figure 10:
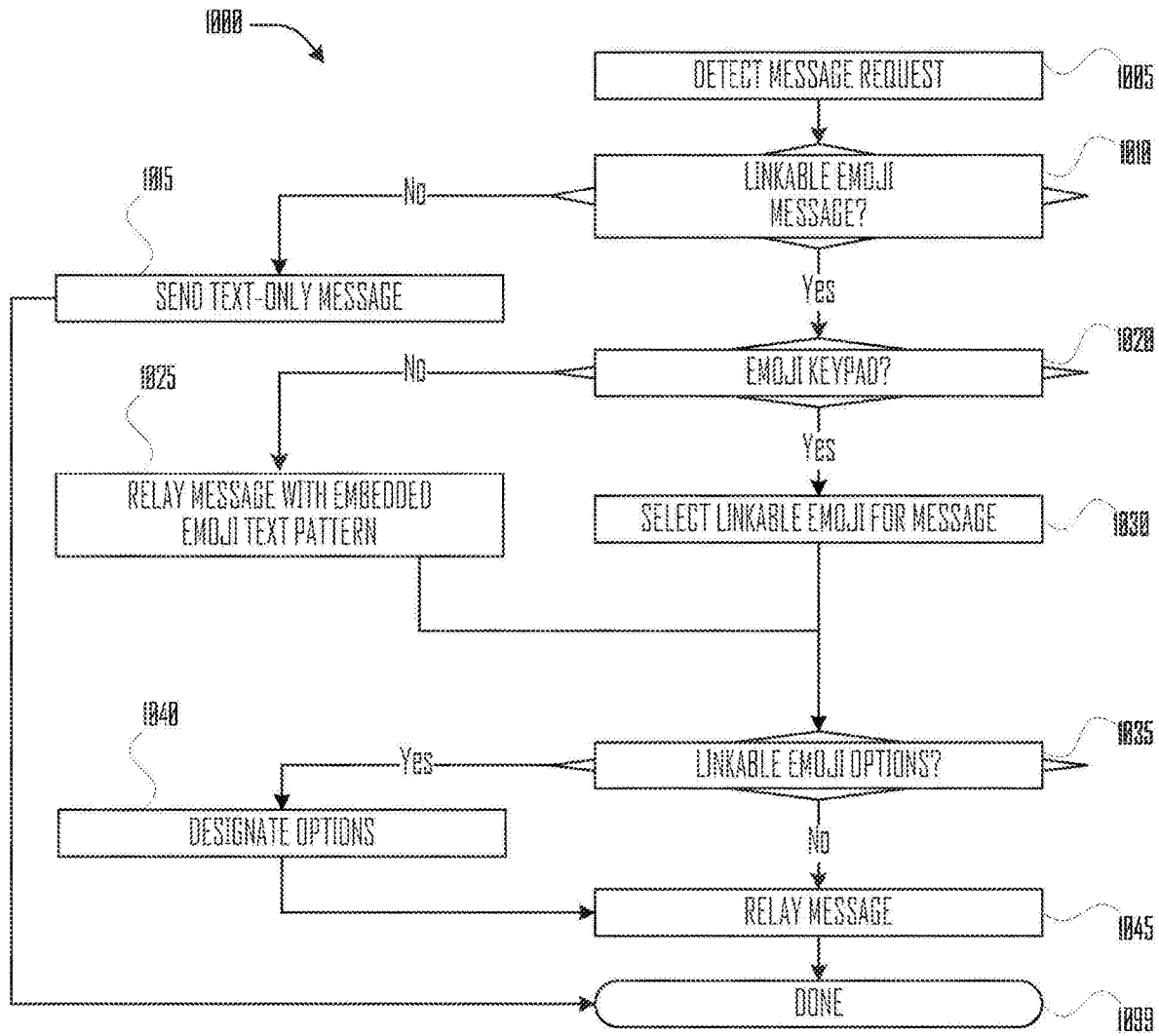
FIG. 10 illustrates a flow diagram of a linkable emoji message routine for the messaging client device shown in FIG. 4 in accordance with one embodiment.

Referring now to FIG. 10, a flow diagram, in accordance with one embodiment, shows a linkable emoji message routine 1000 for the messaging client device 400 shown in FIG. 4. In execution block 1005, routine 1000 starts upon detecting a message request. In query block 1010, routine 1000 determines whether the message will be a linkable emoji message. In one embodiment, this is based on whether a linkable emoji is added to the message. In yet another embodiment, the message text is scanned to see if an embedded emoji text pattern in present. If the message is not a linkable emoji message, routine 1000 sends the text-only message in execution block 1015. For messages with a linkable emoji routine 1000 determines in query block 1020 whether an emoji keypad or keyboard is available. As previously discussed, an emoji keypad/keyboard may be a component of the operating system, an application, or a combination of both. If no emoji keypad/keyboard is available, routine 1000 relays the message with an embedded emoji text pattern associated with the desired linkable emoji in execution block 1025. When available to routine 1000, the emoji keypad/keyboard is used to allow a user to select a linkable emoji for insertion into the message in execution block 1030. In query block 1035, routine 1000 determines whether there are any options and/or conditions associated with the linkable emoji in the message (e.g., conditional parameters). If options need to be designated for a particular linkable emoji, routine 1000 obtains those designations in execution block 1040. Routine 1000 relays the message with the linkable emoji to the messaging server in execution block 1045. Upon sending/relaying the message, routine 1000 ends in termination block 1099.

Figure 11:
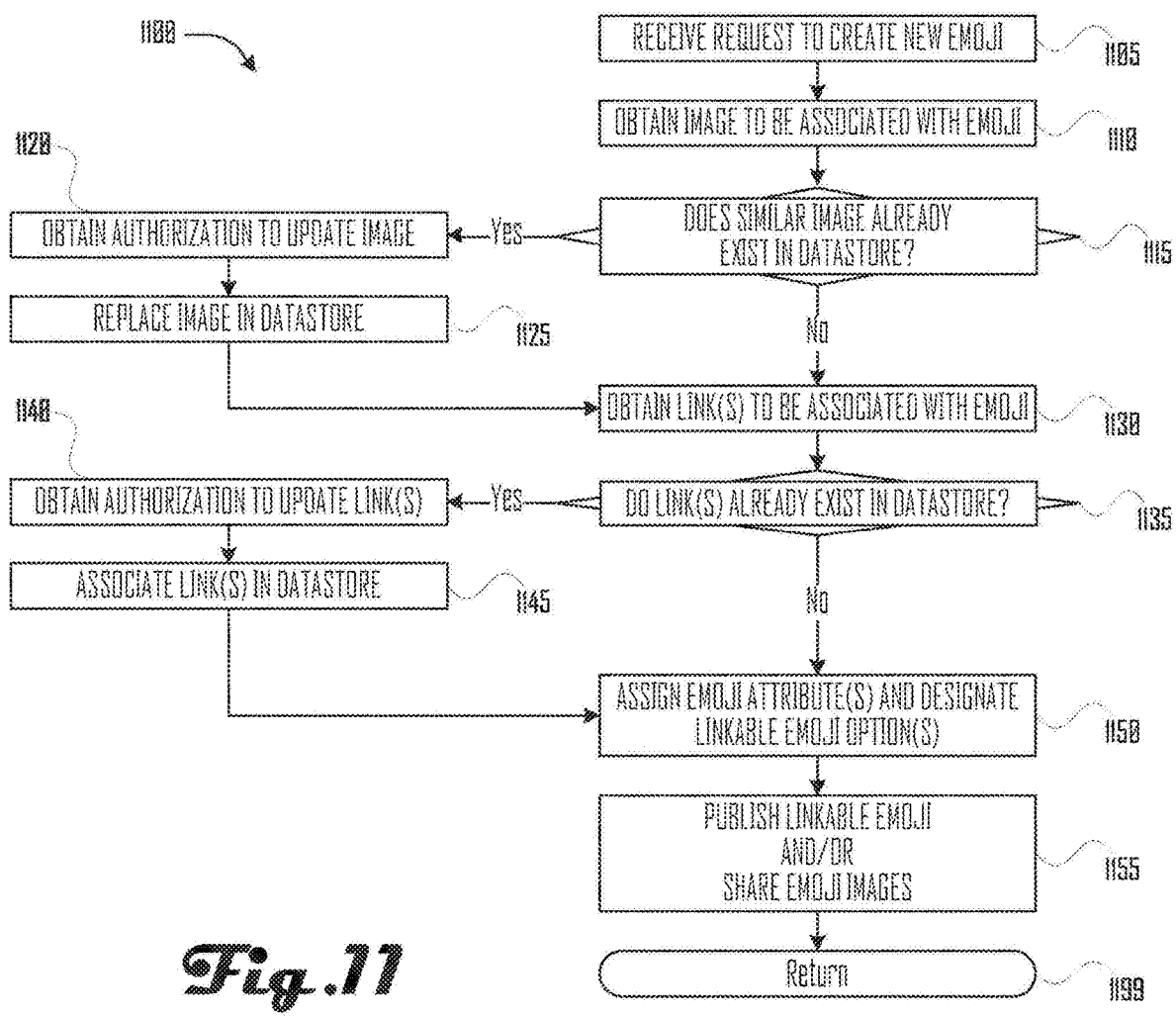
FIG. 11 illustrates a flow diagram of a local emoji creation routine for the messaging client device shown in FIG. 4 in accordance with one embodiment.

Referring now to FIG. 11, a flow diagram shows a local emoji creation routine 1100 for the messaging client device 400 in accordance with one embodiment. In execution block 1105, routine 1100 receives a request to create a new emoji on the client device. The routine 1100 obtains an image to be associated with the new emoji in execution block 1110. In query block 1115, routine 1100 checks to determine whether a similar image already exists in the datastore. In one embodiment, the relative similarity of an image is determined by image attributes including file information, such as name, image size, creation date, and file type. In one embodiment, the relative similarity of an image is based on a pixel by pixel comparison of each emoji, where each pixel receives a relative similarity score. Uniform similarity on a pixel by pixel basis may indicate that the images being compared are similar. As each of the emoji images are relatively small, the pixel by pixel is comparison may be done quickly. Alternatively, some embodiments evaluate the emoji image upon addition to the datastore, so only the new emoji need be evaluation. In one such embodiment, an emoji pixel map is created with a score based on the pixel evaluation, a search may then be conducted for emoji in the datastore that have scores within a desired similarity range. If a similar image is found, routine 1100 obtains authorization in execution block 1120 to update the image and replaces the image with the new image in execution block 1125. Depending on the embodiment, authorization to change the emoji may be obtained from an administrator of the datastore. In one embodiment, authorization may be obtained from a user for local emoji, as an administrator for portions of the local datastore, but a system administrator needs to approve changes to shared emoji. Next routine 1100 obtains at least one link to be associated with the new emoji in execution block 1130. The datastore is checked by routine 1100 in query block 1135 to determine whether the at least one link already exists in the datastore. If a similar link is found, authorization to redirect the link to the new image is requested in execution block 1140. Upon receiving authorization, routine 1100 associates the at least one link with the new emoji in the datastore in execution block 1145. In one embodiment, the same link may be associated with many different emoji, in which case associating/updating includes adding the new emoji to the list of related emoji in the datastore. Once the image and at least one link of the new linkable emoji are verified against the existing datastore, routine 1100 assigns attributes and designates options associated with the new linkable emoji in execution block 1150. In execution block 1155, routine 1100 publishes the linkable emoji to the local datastore and/or recommends that the linkable emoji be shared. In one embodiment, new emoji must be shared globally via the datastore associated with the messaging server before they can be universally included in a message. Thus, as shown previously, the new emoji may be sent from the client device to the messaging server for consideration and approval to be added to the local datastore update shared by the datastore with client devices (see e.g., FIG. 7 above). If approved the new emoji is included in an update Further, one embodiment shares a new emoji directly with target client device before transmitting a message including the new emoji. In this manner, the new emoji may be propagated from an originating client device to the local datastore of a target client device. In one embodiment, the target client device after receiving may optionally choose to add the new linkable emoji to the target local datastore for future use. After publication/sharing the new emoji, routine 1100 returns in termination block 1199.

Figure 12:
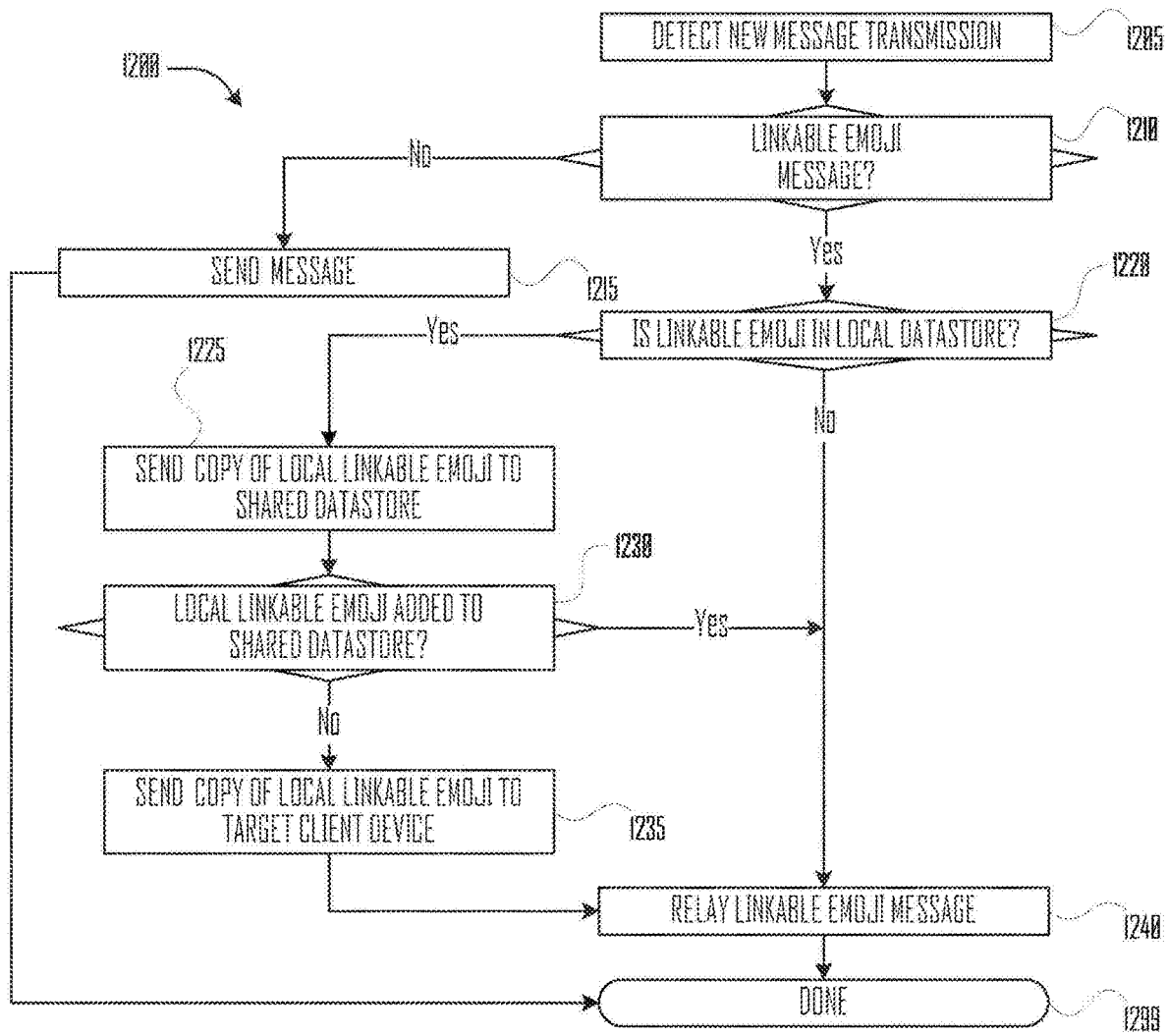
FIG. 12 illustrates a flow diagram of a local linkable emoji distribution routine for the messaging client device shown in FIG. 4 in accordance with one embodiment.

Referring now to FIG. 12, a flow diagram shows a local linkable emoji distribution routine 1200 for the messaging client device 400 in accordance with one embodiment. In execution block 1205, routine 1200 detects a new message transmission. In query block 1210, routine 1200 determines whether the message includes a linkable emoji. If no linkable emoji is included, routine 1200 sends the message in block 1205. Otherwise routine 1200, in query block 1220 determines whether the linkable emoji in the message is already in the local datastore. If not found in the local datastore, the linkable emoji originates from the shared datastore, which should be available to every client device so routine 1200 merely relays the linkable emoji message in execution block 1240. However, if the linkable emoji is in the local datastore, routine 1200 sends a copy of the local linkable emoji to the shared datastore in execution block 1225. As previously shown in FIG. 3, the shared datastore includes portions on the client device and messaging server. Accordingly, upon receiving a copy of the linkable emoji, an administrator may authorize addition of the linkable emoji to the shared datastore. In query block 1230, routine 1200 determines whether the local linkable emoji has been added to the shared datastore. In one embodiment, this process may include the determination of whether an equivalent or substitute linkable emoji exists in the shared datastore. Once the local linkable emoji is added to the shared datastore, a target client device will have access to associated links and content so that routine 1200 can relay the linkable emoji message in execution block 1240. If the local linkable emoji is not added to the shared datastore, routine 1200 sends a copy in execution block 1235 of the local linkable emoji to the target client device for use with the emoji message and then relays the linkable emoji message to the target client device in execution block 1240. Routine 1200 ends in termination block 1299, once the emoji message has been sent and/or relayed.

Figure 13:
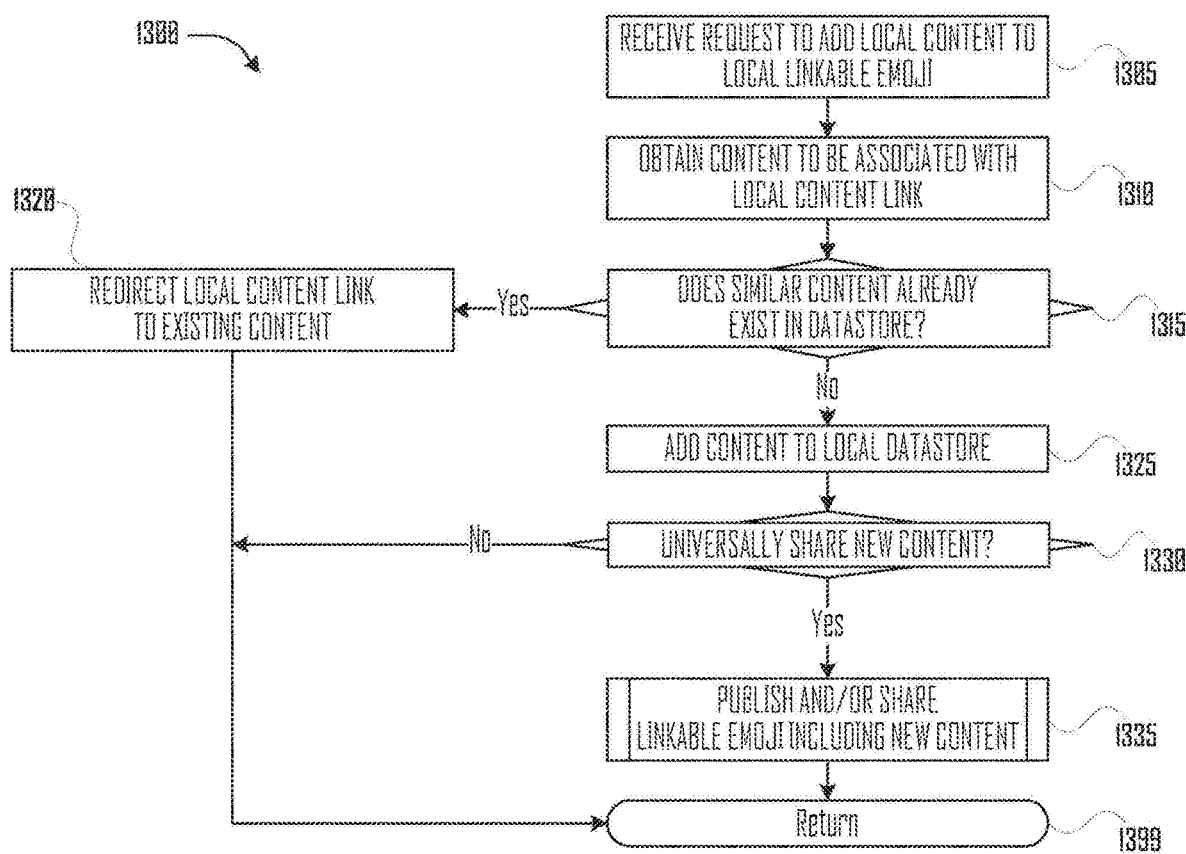
FIG. 13 illustrates a flow diagram of a local content routine for the messaging client device shown in FIG. 4 in accordance with one embodiment.

Referring now to FIG. 13, a flow diagram shows a local content routine 1300 for the messaging client device 400 in accordance with one embodiment. Routine 1300 responds to a request received in execution block 1305 to add local content to a local linkable emoji. In one embodiment, a user may have created content that they desire to be available when the target user clicks on the linkable emoji. The request may include the content, a link to the content, or redirect to a sponsor server that dynamically generates custom links for sponsored content. In execution block 1310, routine 1300 obtains the content to be associated with the local content link. In various embodiments content may be stored remotely for easier access by target client devices. Alternatively, content may be maintained locally. For example, when sensitive content, such as personal images or information, is involved a user may feel more comfortable maintaining the content locally to better control access. Once routine 1300 obtains the content, locally or remotely, query block 1315 determines whether similar content already exists in the datastore. If the content already exists in the datastore, routine 1300 redirects the local content link to the existing content in execution block 1320. Otherwise routine 1300 adds the content to the local datastore in execution block 1325. In query block 1330, routine 1300 determines whether to share the added content universally. If the new content is to be shared, routine 1300 publishes/shares the linkable emoji including the new content in subroutine 1335 and then ends in termination block 1399. Otherwise if the new content is to remain private, Routine 1300 ends and returns directly in termination block 1399.

Figure 14:
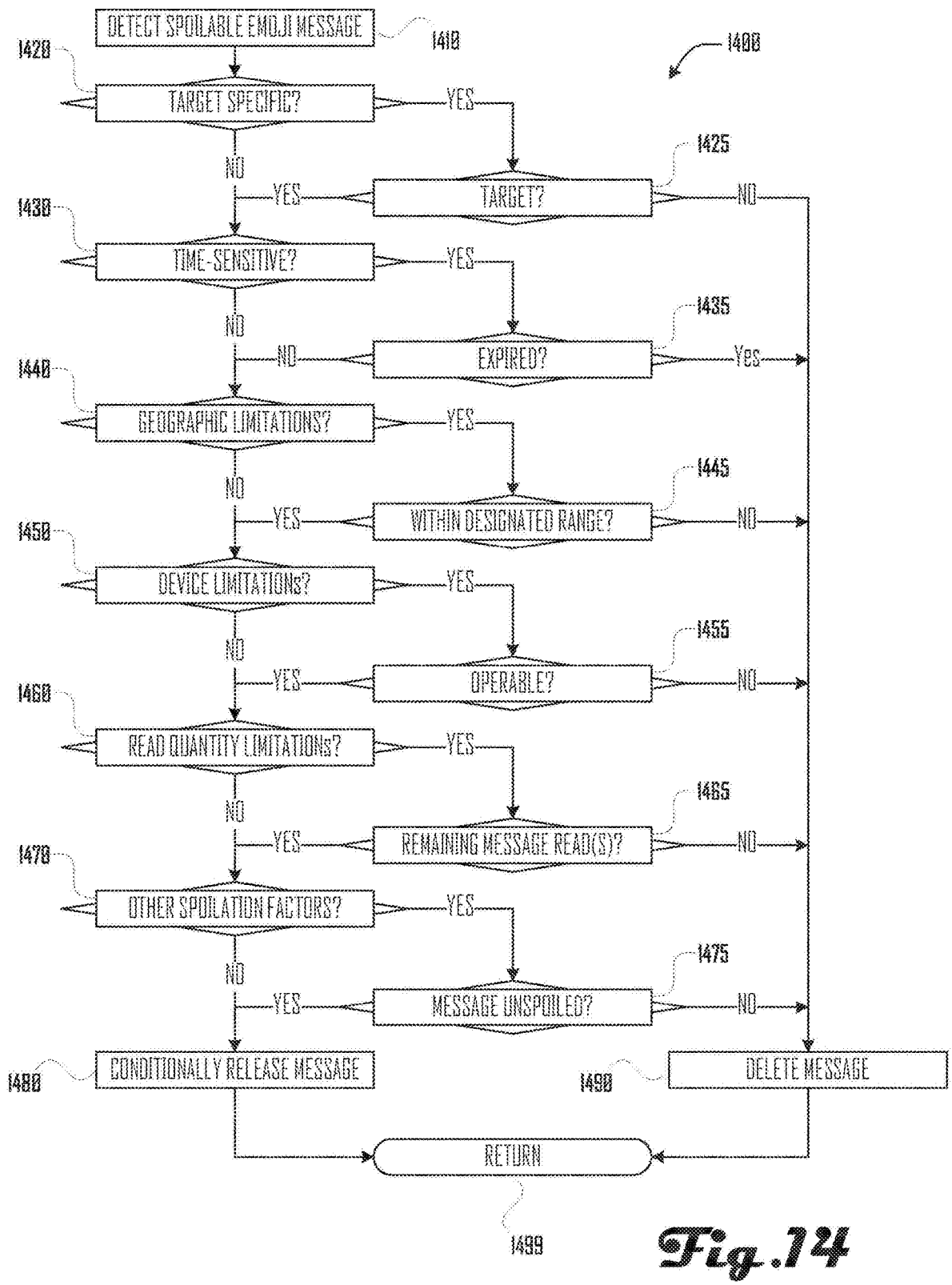
FIG. 14 illustrates a flow diagram of a spoliation subroutine in accordance with one embodiment of the conditional linked content routine shown in FIG. 9.

Referring now to FIG. 14, a flow diagram shows an example of a spoliation subroutine 1400 in accordance with one embodiment of the conditional linked content routine shown in FIG. 9. There are a variety of factors that can spoil a message and a whole variety of alternate and/or equivalent implementations, including order of execution that may be substituted for the specific embodiments shown and described in FIG. 9 without departing from the scope of the present disclosure for spoliation. Turning to the illustrated embodiment, routine 1400 detects a spoilable emoji message in execution block 1410.

In query block 1420, routine 1400 determines if the message is target specific. If the message is target specific, query block 1425 determines if the client device is associated with the target. If not, the message is spoiled and routine 1400 deletes the message in execution block 1490 without letting it be read and returns in termination block 1499.

In query block 1430, routine 1400 determines if the message is time sensitive. If the message is time-sensitive, query block 1435 determines if the message is expired. If expired, the message is spoiled and routine 1400 deletes the message in execution block 1490 without letting it be read and returns in termination block 1499.

In query block 1440, routine 1400 determines if the message has geographic limitations. If the message is limited geographically, query block 1445 determines if the client device is within a designated range. If not, the message is spoiled and routine 1400 deletes the message in execution block 1490 without letting it be read and returns in termination block 1499.

In query block 1450, routine 1400 determines if the message has device limitations. If the message is device limited, query block 1455 determines if the client device is operable with the content and/or content. If not, the message is spoiled and routine 1400 deletes the message in execution block 1490 without letting it be read and returns in termination block 1499.

In query block 1460, routine 1400 determines if the message has read quantity limitations. For example, a sender may only want a message to be read once or twice before being deleted. Alternatively, a sender may only want the content associated with the message to be exposed once or twice before being removed. Accordingly, if the message is read quantity limited, query block 1465 determines how many message read(s) remain. If not, the message is spoiled and routine 1400 deletes the message in execution block 1490 without letting it be read and returns in termination block 1499.

In query block 1470, routine 1400 determines if the message is subject to other spoliation factors. A spoliation factor may include events, attributes, or circumstances which invalidate the message. These spoliation factors may be designated by the original sender, messaging server, sponsorship server, and/or target client device. If the message is subject to other spoliation factors, query block 1475 determines if the message is unspoiled. If unspoiled, routine 1400 conditionally releases the message in execution block 1480 and returns in termination block 1499. If spoiled, routine 1400 deletes the message in execution block 1490 and returns in termination block 1499.

Figure 15:
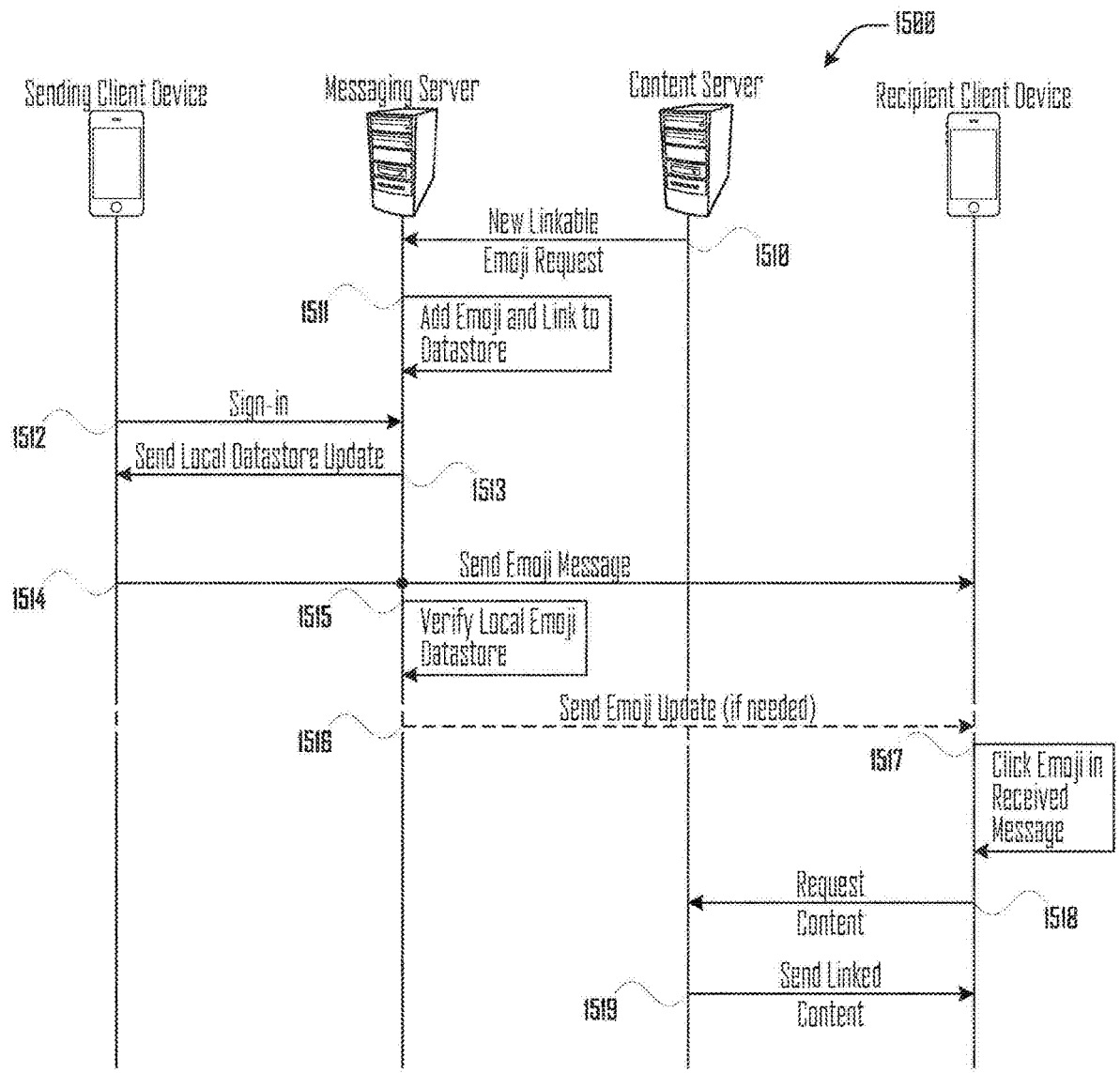
FIG. 15 illustrates a series of communications between various devices distributing a linkable emoji for use in a real-time message in accordance with one embodiment.

Referring now to FIG. 15, a sequence of communications 1500 between various devices are shown distributing a linkable emoji for use in a real-time message in accordance with one embodiment. The illustrated sequence of communications 1500 show one scenario in which a messaging server distributes a linkable emoji based on a new linkable emoji request 1510 received from a content server. The illustrated sequence of events is provided as an example for illustrative purposes. In other embodiments, a similar distribution process of linkable emoji may be obtained via a different sequence of events and/or operations.

Beginning the illustrated sequence of communications 1500, a content server requests a messaging server to generate a new linkable emoji. In one embodiment, the request may include an emoji image, emoji text pattern, and/or emoji link. For example, the request may include a linkable emoji 2410 (see e.g., FIG. 24 below) and/or a conditional linkable emoji 2510 (see e.g., FIG. 25 below). The messaging server adds 1511 the emoji image and link to the datastore. Subsequently, when a sending client device connects 1512 to the messaging server a local datastore update is sent to the sending client device 1513 that includes the newly added linkable emoji. Making the new linkable emoji available when the sending client device sends 1514 an emoji message to a recipient client device. Upon receiving the emoji message, messaging server verifies 1515 the local emoji datastore of the recipient client device and, if necessary, sends 1516 a local emoji datastore update to the recipient client device that includes the linkable emoji. Upon receiving the message, a user reading the emoji message clicks 1517 on the emoji embedded in the received message. The recipient client device requests 1518 the content associated with the linkable emoji from the content server. The content server sends 1519 the linked content to the requesting recipient device.

Figure 16:
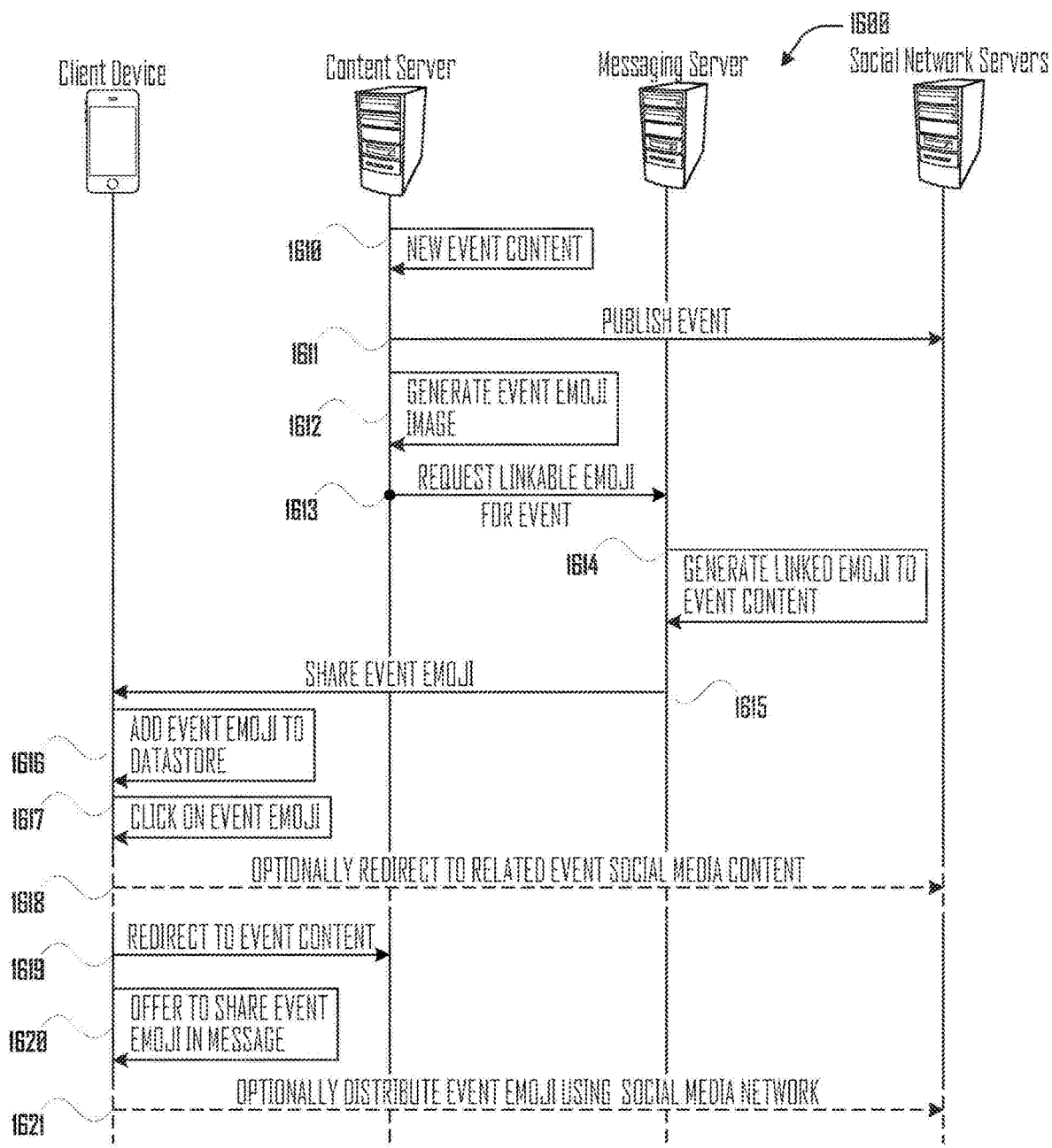
FIG. 16 illustrates a series of communications between various devices promoting a linkable emoji associated with an event for use in a real-time message in accordance with one embodiment.

Referring now to FIG. 16, a sequence of communications 1600 between various devices are shown promoting a linkable emoji associated with an event for use in a real-time message in accordance with one embodiment. The illustrated sequence of communications 1600 show one scenario in which a messaging server distributes a linkable emoji associated with an event being promoted on both social network servers and content servers. The illustrated sequence of events is provided as an example for illustrative purposes. In other embodiments, a similar distribution process of linkable emoji may be obtained via a different sequence of events and/or operations.

Beginning the illustrated sequence of communications 1600, a content server begins with the creation 1610 of new event content. The event is published 1611 to a variety of social network servers in an effort to promote the new event. The content server also generates 1612 a new event emoji image. Then the content server requests 1613 the messaging server for a linkable emoji to associate with the event. The request may include the proposed event emoji image. The messaging server generates 1614 a linked emoji associated with the event content. Next, the messaging server shares 1615 the event emoji with at least one client device in accordance with one embodiment. The client device adds 1616 the event emoji to the local datastore as a shared emoji. If a user of the client device clicks 1617 on the event emoji, the client device may optionally redirect 1618 to related event social media content on the social network servers and/or redirect 1619 to event content on the content server. In one embodiment, the client device broadcasts positive user actions, such as ticket or album purchases to at least one of the content server and/or the social network server. When the user writes an emoji message, the client device may also offer 1620 to share the event emoji in the emoji message. Additionally, the client device may encourage a user to optionally distribute 1621 the event emoji using the user's social media network channels on the social media servers.

Figure 17:
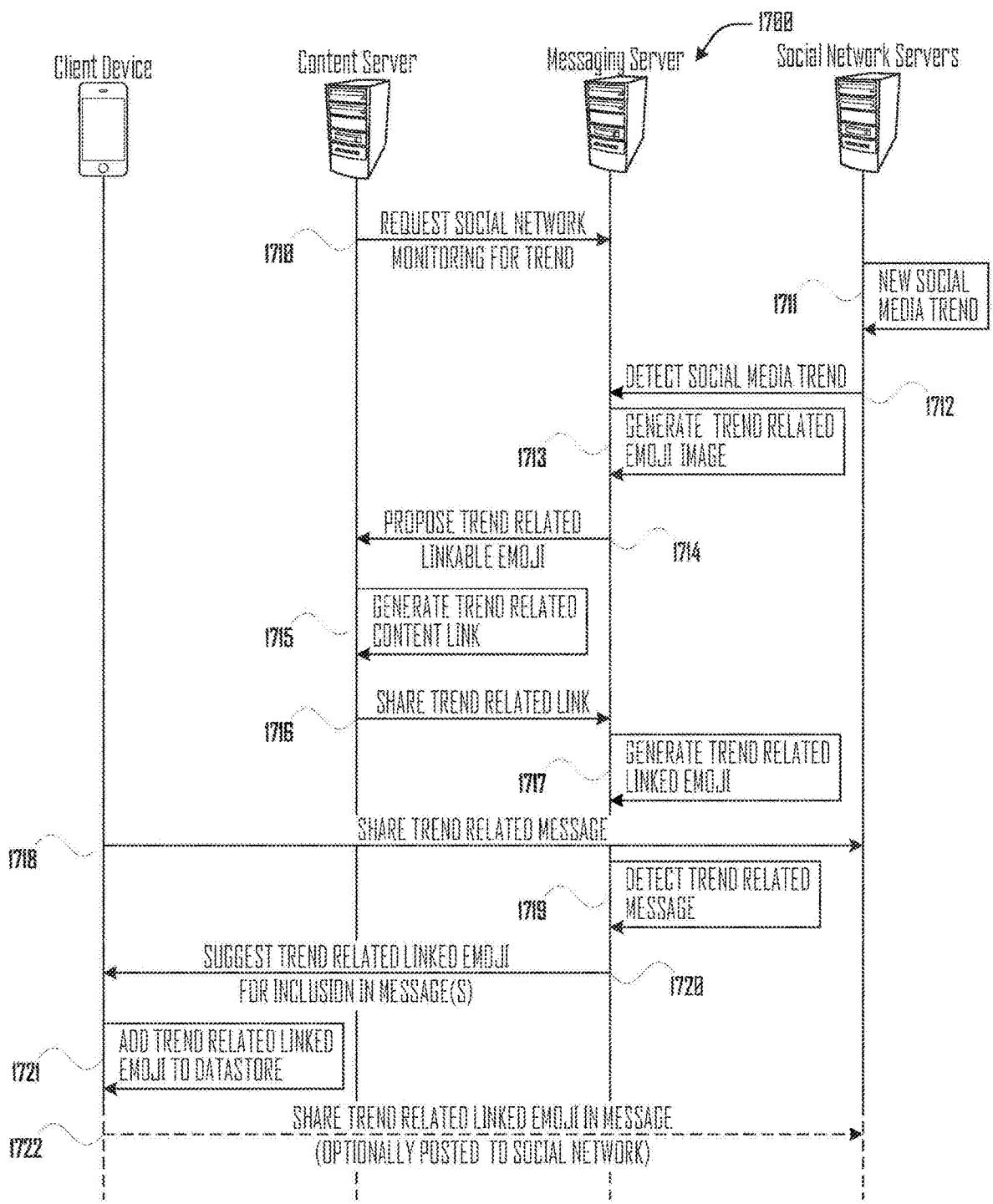
FIG. 17 illustrates a series of communications between various devices identifying a trend to be associated with a linkable emoji for use in a real-time message in accordance with one embodiment.

Referring now to FIG. 17, a sequence of communications 1700 between various devices are shown identifying a trend to be associated with a linkable emoji for use in a real-time message in accordance with one embodiment. The illustrated sequence of communications 1700 show one scenario in which a messaging server detects a social trend and generates a linkable emoji associated with the trend. The illustrated sequence of events is provided as an example for illustrative purposes. In other embodiments, a similar identification and distribution process of trend related linkable emoji may be obtained via a different sequence of events and/or operations.

Beginning the illustrated sequence of communications 1700, a content server begins by requesting 1710 monitoring by the messaging server of designated social network servers for desired trends or activities. After a new social media trend is spawned 1711 on the social network servers, the messaging detects 1712 that the new trend fortuitously matches the desired request. Alternatively, in one embodiment, the messaging server could monitor the social network servers for any new social media trends and present any relevant trends for consideration by the content server. Once the trend is detected, messaging server generates 1713 a trend related emoji image. Afterwards the messaging server proposes 1714 the trend related linkable emoji for consideration by the content server. The content server finds related content and generates 1715 a trend related content link and shares 1716 the trend related content link with the messaging server. The messaging server generates 1717 a trend related linked emoji.

Whenever a client device shares 1718 a trend related message on a social network server, the messaging server detects 1719 the trend related message and suggests 1720 the trend related linked emoji to the client device for inclusion in trend related messages. The client device adds 1721 the trend related linked emoji to the datastore. Once added to the local datastore, the client device can share 1722 the trend related linked emoji in messages and optionally post to social networks.

Figure 18:
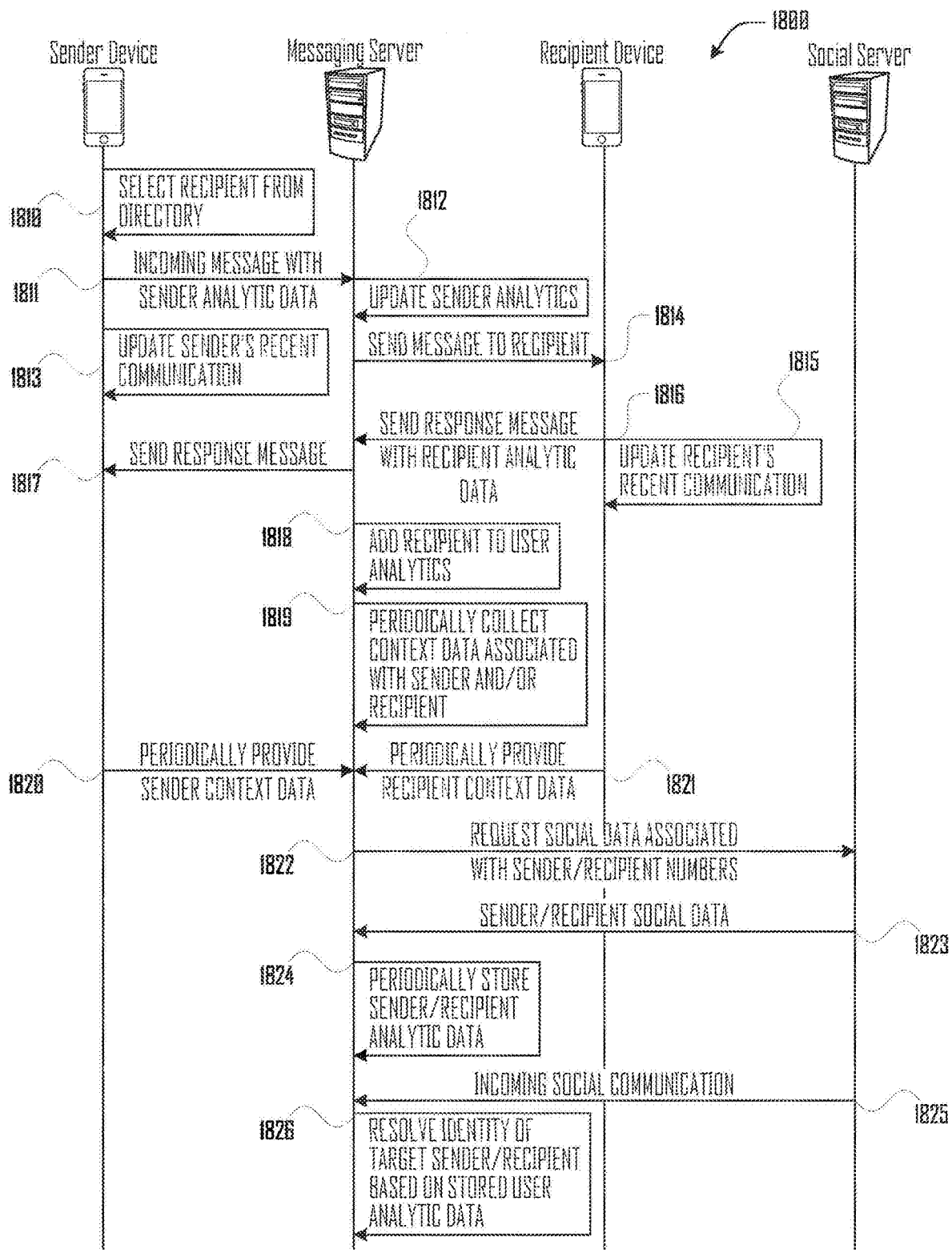
FIG. 18 illustrates a series of communications between various devices collecting contextual data related to a linkable emoji based on use in real-time messages in accordance with one embodiment.

Referring now to FIG. 18, a sequence of communications 1800 between various devices are shown collecting contextual data related to a linkable emoji based on use in real-time messages in accordance with one embodiment. The illustrated sequence of communications 1800 show one scenario in which a messaging server detects and collects contextual and analytic data related to a linkable emoji. The illustrated sequence of events is provided as an example for illustrative purposes. In other embodiments, a similar data collection process may be obtained via a different sequence of events and/or operations.

Beginning the illustrated sequence of communications 1800, a sender device selects 1810 a recipient from a directory. The sender device sends 1811 a message to a recipient that includes hidden embedded analytic data and updates 1813 sender's recent communication log. In one embodiment, the analytic data includes sender device information. Collected device information may include the data network type, such as cellular, direct, or wireless being used to send the message. Additionally, geographic location, device and user information may also be included. The messaging server updates 1812 the sender analytics in the datastore and sends 1814 the message to a recipient device. In one embodiment, the messaging server strips the message of analytics content prior to relaying the message to the recipient device. The recipient device sends 1816 a response message with recipient analytic data and updates 1815 recipient's recent communication. The messaging server adds 1818 the recipient analytics to the datastore and sends 1817 the response message to the sender device.

Once added, the messaging server periodically collects 1819 and stores 1824 contextual and other analytic data associated with sender device and/or recipient device. In response, the sender device periodically provides 1820 sender context data and the recipient device periodically provides 1821 recipient context data. The messaging server may also request 1822 additional social data associated with sender/recipient from a social server. In response, the social server may provide 1823 sender/recipient social data. Once identified by the social server, the messaging server can identify incoming social communication 1825 and resolve 1826 the identity of the target sender/recipient sending/receiving the social communication based on stored user analytic data.

Referring now to FIG. 22, side by side screenshots show a sender mobile messaging device 2205 and a recipient mobile messaging device 2210 exchanging real-time messages to share at least one content link associated with an embedded linkable emoji in accordance with one embodiment. In the illustrated screenshots, the sender mobile messaging device 2205 sends a message with an embedded linkable emoji and the recipient mobile messaging device 2210 clicks the linkable emoji. The recipient mobile messaging device 2210 detects the link and queries the user for how to "Complete Requested Action using:" by requesting designation of a browser to follow the link.

Referring now to FIG. 23, side by side screenshots show a sender mobile messaging device 2305 and a recipient mobile messaging device 2310 exchanging real-time messages to share content associated with an embedded linkable emoji sent in a real-time message in accordance with one embodiment. The sender mobile messaging device 2305 recommends a restaurant with a linkable emoji. The recipient mobile messaging device 2310 views the linked content and responds that the restaurant "Looks Great!" and proposes a time to meet the sender (as shown on the screen of the sender mobile messaging device 2305).

Figure 24:
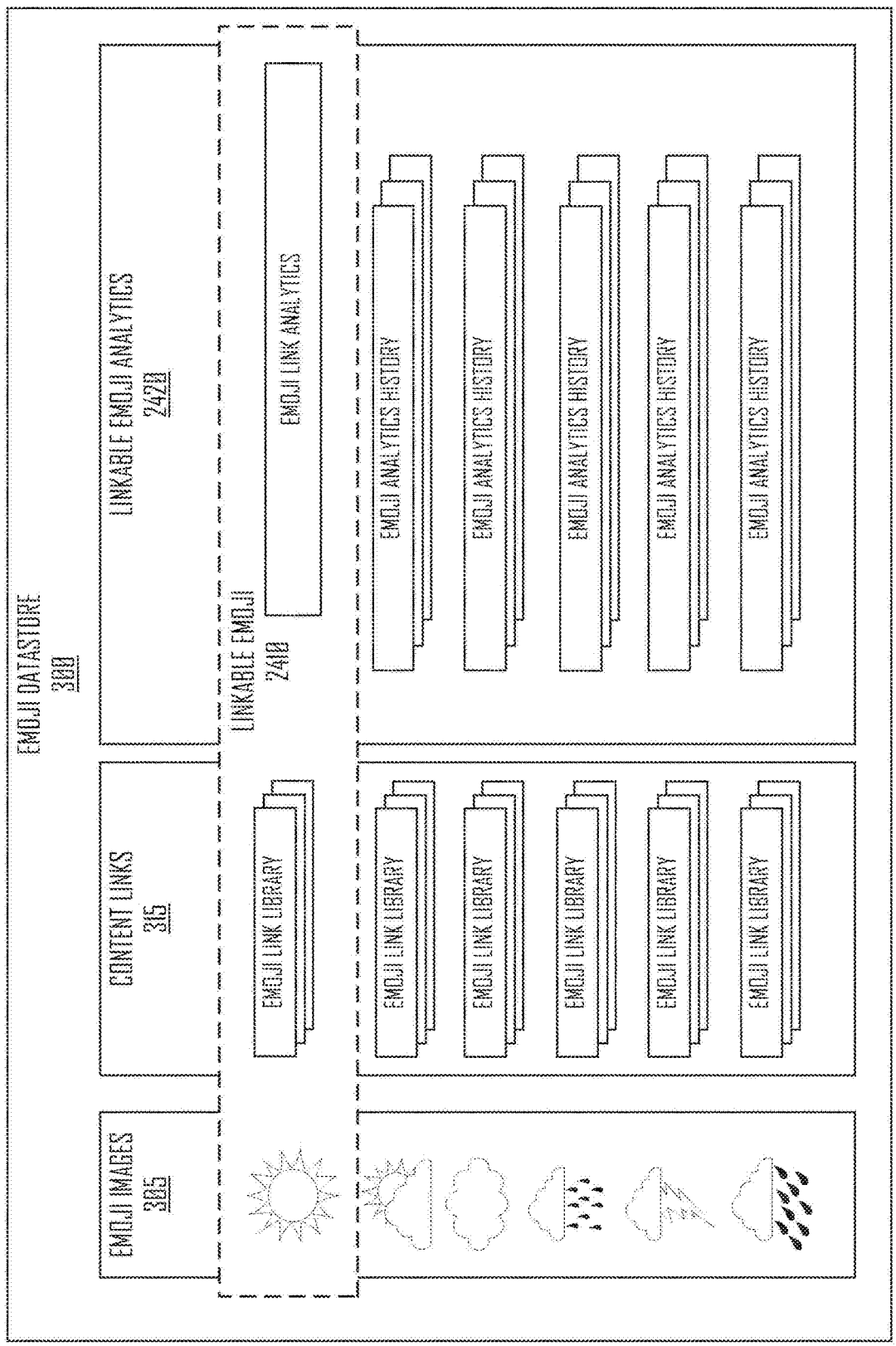
FIG. 24 illustrates several components of an emoji datastore in accordance with at least one embodiment.

Referring now to FIG. 24, several components of a linkable emoji 2410 are shown stored in an emoji datastore 300 in accordance with at least one embodiment. As previously discussed, the emoji datastore 300 includes emoji images 305, content links 315, and linkable emoji analytics 2420. Each linkable emoji 2410 in the emoji datastore 300 includes at least one emoji image (e.g., sun), a related emoji link library, and emoji link analytics. The linkable emoji 2410 may also include a text pattern corresponding to the emoji. The emoji link analytics may include conditional parameters, spoliation factors, emoji analytics history, and other information regarding the use, link(s), and content associated with the emoji. This information may be used by interested parties to evaluate the relative social traction and effectiveness of a particular emoji.

Referring now to FIG. 25, several components of a conditional linkable emoji 2510 are shown stored in an emoji datastore 300 in accordance with at least one embodiment. The emoji datastore 300 includes emoji images 305, content links 315, and conditional link analytics 2550. The conditional linkable emoji 2510 includes an emoji image 2515, emoji link library 2520, and conditional emoji link conditions 2525 (e.g., conditional parameters). The illustrated embodiment shows an emoji created for an artist. The emoji link library 2520 includes an artist fan link 2555, artist related concert ticket link(s) 2560, artist related album link(s) 2565, and artist related performance concert link(s) 2570. The artist fan link 2555 is the default link 2530. Based on the related conditional emoji link conditions 2535 (e.g., conditional parameters), the artist related concert ticket link(s) 2560 becomes the active link whenever the client device indicates that the device is within 50 miles of a concert location and the concert date is less than 30 days away and the concert is not sold out. The artist related album link(s) 2565 become the active link(s) whenever the related conditional emoji link conditions 2540 indicate the client device is within 50 miles of a concert location and the concert date is less than 30 days away but the concert is not sold out. The artist related performance concert link(s) 2570 become the active link(s) whenever the related conditional emoji link conditions 2545 indicate the client device is within 50 miles of a concert location and the concert date is more than 30 days away and the concert is sold out.

Figure 26:
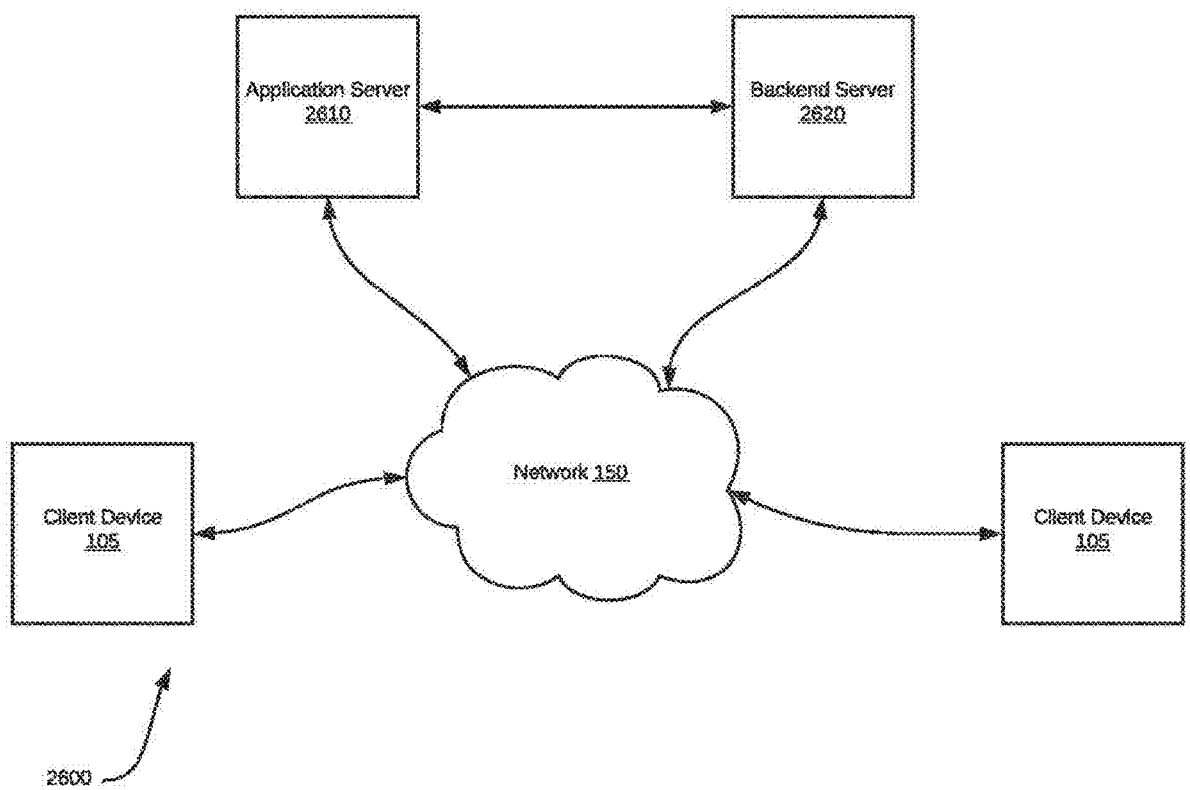
FIG. 26 illustrates an exemplary embodiment of a simplified network diagram according to aspects of the present disclosure.

FIG. 26 illustrates an exemplary embodiment of a simplified network diagram according to aspects of the present disclosure. The system 2600 includes two client devices 105 (e.g., first and second client devices) coupleable to the network 150. One of the client devices 105 may be a sending device and one of the client devices 105 may be a receiving device in various embodiments. Although illustrated with both client devices 105 being coupled to the network 150, it should be appreciated that only one client device 105 might be coupled at any moment in time to the network 150 and/or that a plurality of client devices 105 may be coupled to the network 150 at any time (whether functioning as a sending or receiving device or not).

An application server 2610 may be coupleable to the network 150. The application server 2610 may be configured to perform at least one operation upon a message passing from one client device 105 to another client device 105. The application server 2610 may include or take the form of a messaging server 200 as previously described herein in various embodiments, either in whole or in part. The application server 2610 may include one or more of a processing unit 210, a memory 250, and/or an optional display interface 240, and may be interconnected along with the network interface 230 via a communication bus 220. The memory 250 may be a random-access memory ("RAM"), a read only memory ("ROM"), and/or a permanent mass storage device, such as a disk drive, flash device, or the like.

The application server 2610 may be coupleable to the network 150 via at least one wired and/or wireless connections. The application server 2610 may be configured to collect (e.g., by interception or other type of acquisition) at least one message transmitted from a user device 105. The application server 2610 may be configured to interpret the collected message and may selectively extract at least one element therefrom. For example, the application server 2610 may extract message content and/or metadata from the collected message. Message content and/or metadata may include textual content, image content, emoji content, one or more message or content parameters, addressing information, or any other type of message data or metadata included within or otherwise determinable in association with the collected message. The application server 2610 may include or be configured to access a data repository including user information, device information, message information, content, or any other information or data associated with a user, the system, a message, a provider, or other entity or element.

The application server 2610 may be configured to interface with a backend server 2620. Although illustrated as a single backend server 2620 it should be appreciated that two or more backend servers 2620 may be coupled to the network 150 and/or may be implemented as a distributed computing environment without departing from the spirit and scope of the present disclosure. The backend server 2620 may be an Application Programming Interface (API) server configured to operate according to a public and/or private API. Additionally or alternatively, the backend server 2620 may be an interface server, a middleware server, or any other type of single or distributed computing element configured to perform at least one operation of storing, sending, and/or receiving information, data, metadata, or combination thereof. The backend server 2620 may be provided by a communications or content provider, such as an electronic messaging provider, a social media provider, a telecommunications server provider, or any other provider of at least one service. The application server 2610 might thus act as an intermediary processing device between the user device 105 and the backend server 2620 to perform one or more processing operations. In various embodiments, the application server 2610 may function as a gateway to access one or more backend servers 2620. The application server 2610 and backend server 2620 may be configured to directly communicate with one another in various embodiments.

In various exemplary embodiments, the application server 2610 may be configured to provide a security and/or encryption function. For example, the application server 2610 may associate a user token received from a client device 105 and may associate the user token with a third-party application or API implemented or implementable in association with a backend server 2620. A persistent connection may be established between a user agent executed by the client device 105 and the application server 2610 and/or the backend server 2620. A persistent connection may optionally not be established, or a timeout may expire. The user agent of a client device 105 may create a Packet Data Protocol (PDP) context for the persistent connection message and establish a connection to the application server 2610 and/or a configuration manager executed by the application server 2610 or other server (such as a backend server 2620). A response may be sent, the response including output data generated by an API of the application server 2610 and/or backend server 2620 to the originating client device 105 and/or to a target client device 105. An analysis server or communications server may be utilized during any part of this process.

One or more elements of a collected message may be stored locally at originating client device 105, at a storage of the target client device 105 or a location accessible to the target client device 105, and/or on one or more servers (e.g., application server 2610 and/or backend server 2620) for future usage or analysis. One or more associated API(s) may communicate with a target client device 105 to enforce at least one parameter actions. Examples of parameter actions may include but are not limited to: (i) disabling a link once time expiration is reached, (ii) enabling a function upon arrival of a geolocation, (iii) providing content based at least in part upon device status, and/or (iv) changing an emoji and/or image or subpart thereof based at least in part upon defined parameter(s). In various embodiments a user of the target client device 105 may interact with the message which communicates to the API(s) and may trigger additional actions or responses by the API(s) or originating client.

Figure 27:
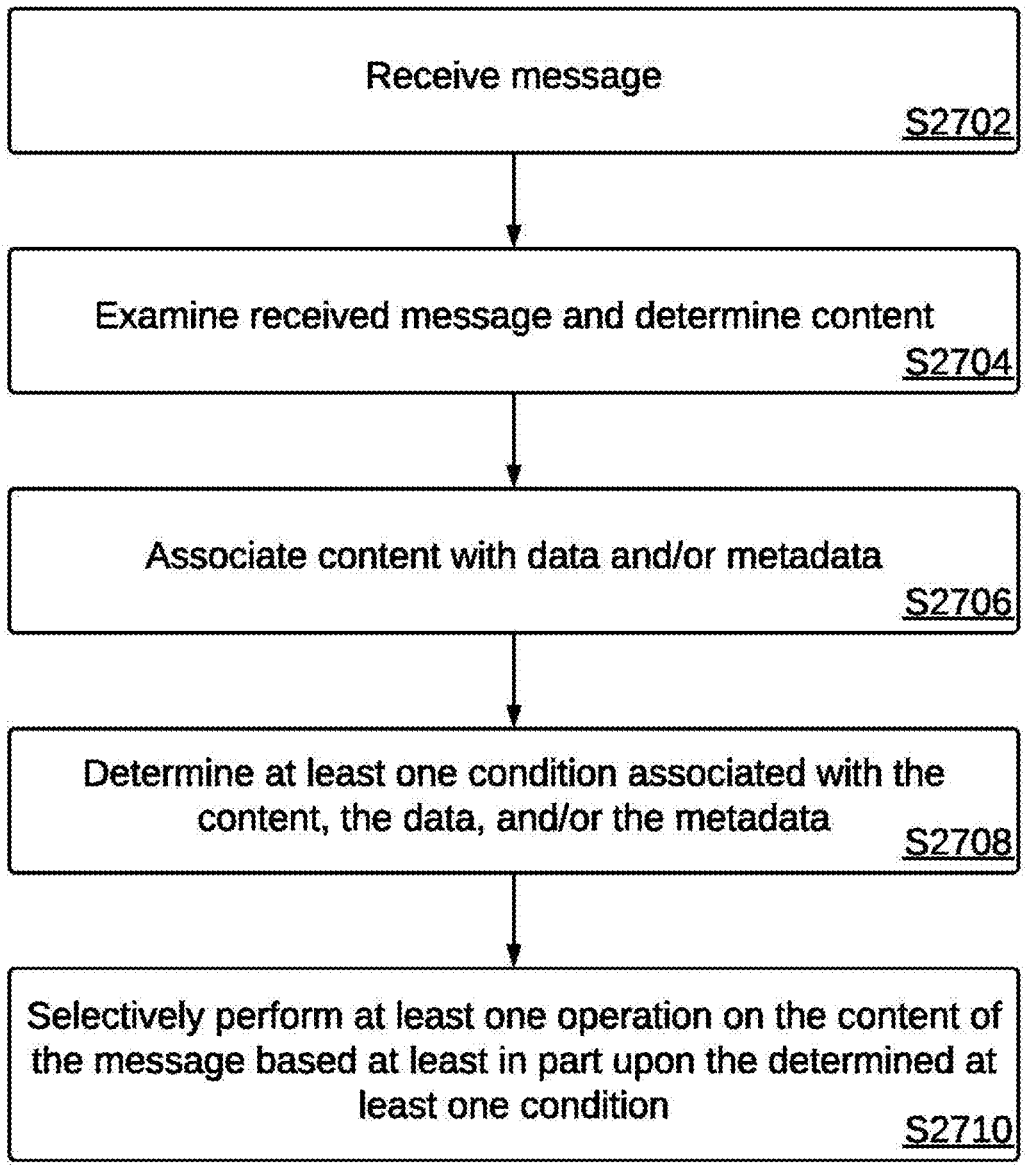
FIG. 27 illustrates an exemplary embodiment of a process flow for performing at least one operation on the content of a received message between a first client device and a second user device according to aspects of the present disclosure.

FIG. 27 illustrates an exemplary embodiment of a process flow for performing at least one operation on the content of a received message between a first client device and a second user device according to aspects of the present disclosure. The process 2700 includes an operation 2702 where a message is received. Receiving the message at operation 2702 may include, for example, receiving the message from a first client device at an application server 2610, and may further include monitoring at least one message between the first client device and a second client device to collect contextual data relating to the content (e.g., as a contextual parameter). The contextual data may include, for example, one or more of a social parameter, a message content condition, and/or device information of the first client device or the second client device. The content of the received message may include image data in various embodiments. One or more operations may be performed in associated with at least one contextual parameter, for example to modify the content, data, and/or metadata of a message or portion thereof based at least in part upon at least one contextual parameter (e.g., data modification, content link modification, message spoliation, or any other operation upon or in association with one or more messages).

The received message is examined at an operation 2704 to determine content of the received message. Content of the received message may include, for example, any set of data, metadata, object(s) data, or any other information or combination thereof without departing from the spirit and scope of the present disclosure. The process 2700 continues to an operation 2706 where content is associated with one or more of data and/or metadata. At least one condition associated with the content, the data, and/or the metadata may be determined at operation 2708. The process 2700 may then include selectively performing at least one operation on the content of the message based at least in part upon the determined at least one condition at an operation 2710. The selectively performing at least one operation of operation 2710 may include performing at least one of selecting, modifying, adding, and/or removing data or metadata responsive to the determined at least one condition associated with the content.

The process 2700 may further include storing a representation of at least one of the received message, the content, or at least one feature of the content at a database by storing the representation and further includes mapping the representation to at least one message or content condition. The at least one message or condition may be referenced in real-time while monitoring communications received from at least one client device. The content of at least one message of the monitored communications may be modified based at least in part upon the at least one message or content conditional parameter.

Figure 28:
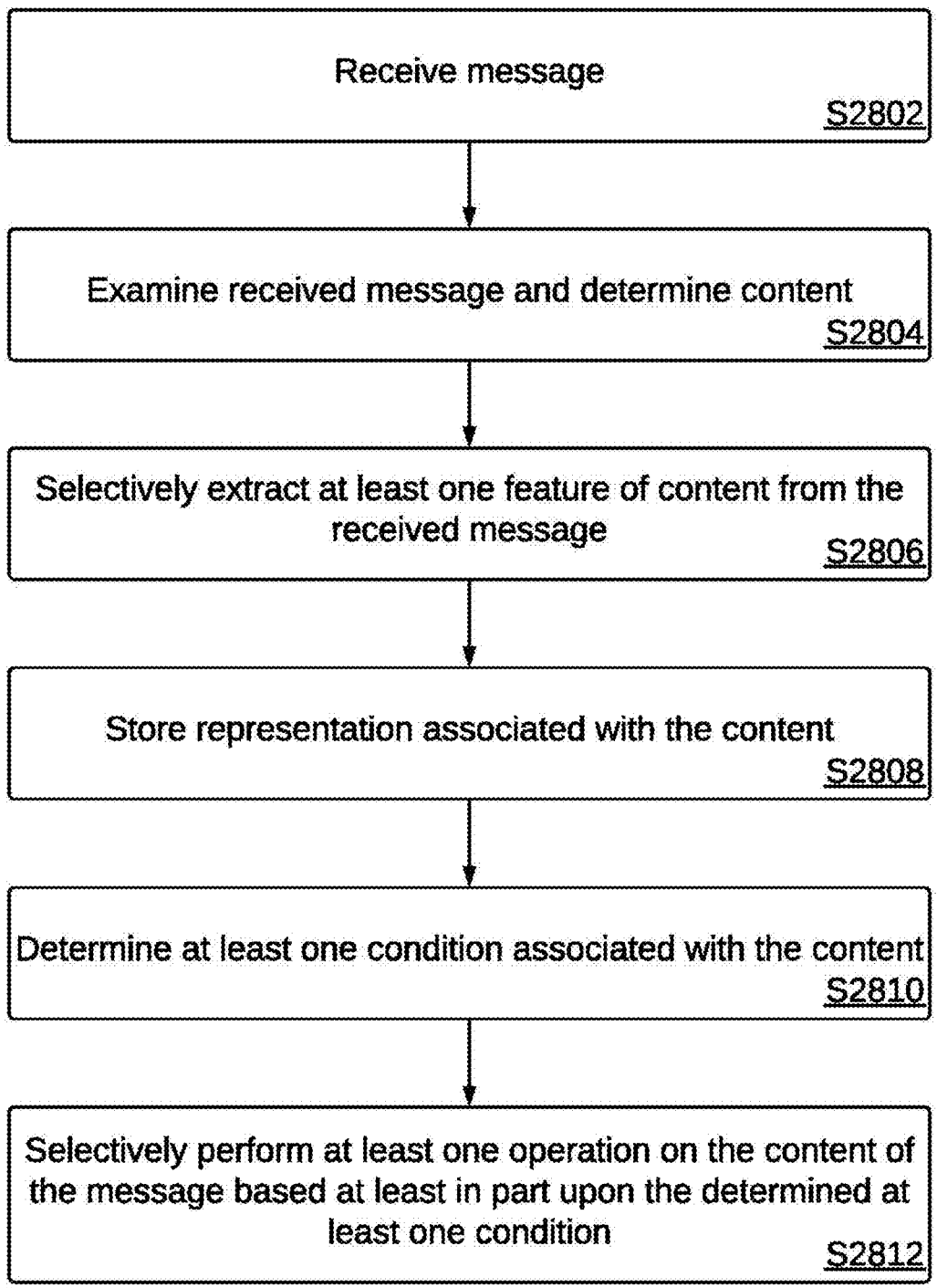
FIG. 28 illustrates a further exemplary embodiment of a process flow for performing at least one operation on the content of a received message between a first client device and a second user device according to aspects of the present disclosure.

FIG. 28 illustrates a further exemplary embodiment of a process flow for performing at least one operation on the content of a received message between a first client device and a second user device according to aspects of the present disclosure. The process 2800 includes an operation 2802 where a message is received. Receiving the message at operation 2802 may include, for example, receiving the message from a first client device at an application server 2610, and may further include monitoring at least one message between the first client device and a second client device to collect contextual data relating to the content. The contextual data may include, for example, one or more of a social parameter, a message content condition, and/or device information of the first client device or the second client device. The content of the received message may include image data in various embodiments.

The received message is examined at an operation 2804 to determine content of the received message. Content of the received message may include, for example, any set of data, metadata, object(s) data, or any other information or combination thereof without departing from the spirit and scope of the present disclosure. The process 2800 continues to an operation 2806 where at least one feature is selectively extracted from the content of the received message. At operation 2808 a representation associated with the content (e.g., selectively associated at least in part with the at least one feature, although any representation may be used without departing from the spirit and scope of the present disclosure) is stored. Content may be associated with one or more of data and/or metadata. At least one condition associated with the content may be determined at operation 2810. The process 2800 may then include selectively performing at least one operation on the content of the message at operation 2812 based at least in part upon the determined at least one condition. The selectively performing at least one operation of operation 2812 may include performing at least one of selecting, modifying, adding, and/or removing data or metadata responsive to the determined at least one condition associated with the content.

Storing the representation associated with the content may include storing the representation at a database and further includes mapping the representation to at least one message or condition. The at least one message or condition may be referenced in real-time while monitoring communications received from at least one client device. The content of at least one message of the monitored communications may be modified based at least in part upon the at least one message or content conditional parameter.

Figure 29:
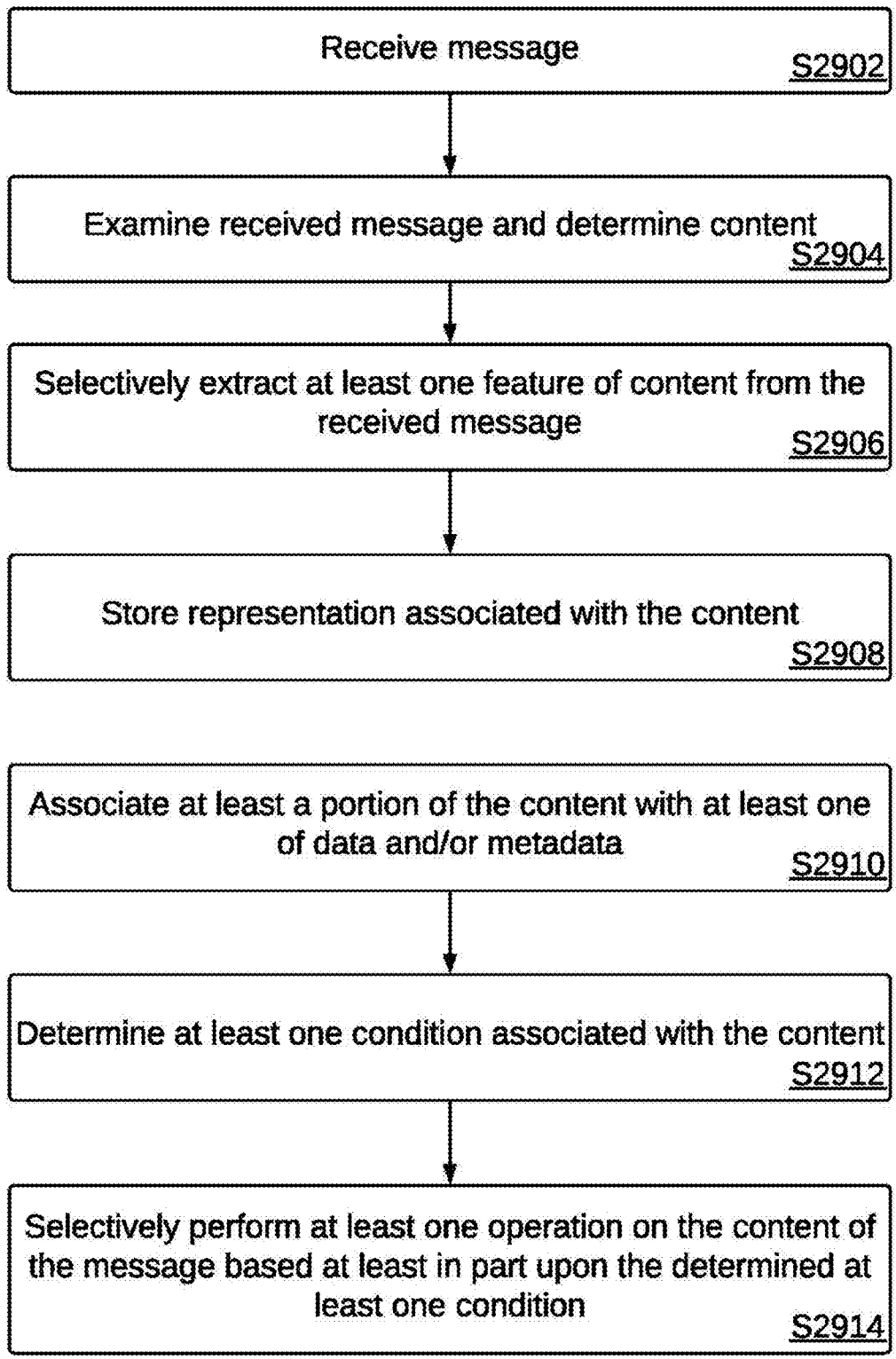
FIG. 29 illustrates a still further exemplary embodiment of a process flow for performing at least one operation on the content of a received message between a first client device and a second user device according to aspects of the present disclosure.

FIG. 29 illustrates a still further exemplary embodiment of a process flow for performing at least one operation on the content of a received message between a first client device and a second user device according to aspects of the present disclosure. The process 2900 includes an operation 2902 where a message is received. Receiving the message at operation 2902 may include, for example, receiving the message from a first client device at an application server 2610, and may further include monitoring at least one message between the first client device and a second client device to collect contextual data relating to the content. The contextual data may include, for example, one or more of a social parameter, a message content condition, and/or device information of the first client device or the second client device. The content of the received message may include image data in various embodiments.

The received message is examined at an operation 2904 to determine content of the received message. Content of the received message may include, for example, any set of data, metadata, object(s) data, or any other information or combination thereof without departing from the spirit and scope of the present disclosure. The process 2900 continues to an operation 2906 where at least one feature is selectively extracted from the content of the received message. At operation 2908 a representation associated with the content (e.g., selectively associated at least in part with the at least one feature, although any representation may be used without departing from the spirit and scope of the present disclosure) is stored. Content may be associated with one or more of data and/or metadata. The process 2900 continues to an operation 2910 where content is associated with one or more of data and/or metadata. At least one condition associated with the content may be determined at operation 2912. The process 2900 may then include selectively performing at least one operation on the content of the message at operation 2914 based at least in part upon the determined at least one condition at an operation. The selectively performing at least one operation of operation 2912 may include performing at least one of selecting, modifying, adding, and/or removing data or metadata responsive to the determined at least one condition associated with the content.

Storing the representation associated with the content may include storing the representation at a database and further includes mapping the representation to at least one message or condition. The at least one message or condition may be referenced in real-time while monitoring communications received from at least one client device. The content of at least one message of the monitored communications may be modified based at least in part upon the at least one message or content conditional parameter.

Aspects of the present disclosure may include a time-oriented klickable, which may optionally be updateable and may be configured to operate as a synchronous and/or asynchronous messaging system. A user of a system consistent with the present disclosure may being by receiving, from an originating client device component of a messaging application (e.g., a user agent), a request to invoke an API hosted on a server, wherein the request is sent either asynchronously or synchronously by the originating client device component (e.g., associated with a first client device). A first security handler may be invoked and configured to 1) authenticate a user of the messaging application that originated the request, and 2) to determine whether the user is authorized to invoke the API. A second security handler may be selectively invoked which is configured to process the request in a manner that mitigates a plurality of different types of application and/or API security attacks in various embodiments. An API may be invoked on a server (e.g., an application server 2610 as previously described herein or other server) which may be configured to crate a connection to a third-party API (provided, for example, by a third-party such as Facebook, Apple, Google, etc.). At least one persistent connection may be created and/or maintained with the server.

The user agent may send an indication of a status of the client device. The indication of the status of the client device may be referred to as a persistent connection message. Persistent connection messages may be sent during the monitoring campaign or when no monitoring campaign is running. One or more persistent connection messages may be used to optimize campaign configuration and device management, and to keep the configuration manager informed about the working status of the client device as well as the user agent. The persistent connection messages may also be sent to another server, such as a data gathering server. The persistent connection messages may be sent periodically (e.g., every three hours or any other period of time). The frequency of the persistent connection may vary depending upon whether a monitoring campaign is running. According to one example, the persistent connection messages may be sent at a specified frequency (e.g., every six hours) during a campaign and less frequently (e.g., only once per day) when the campaign is not ongoing. The frequency that the persistent connection messages are sent can be set from the configuration manager of the system. If no persistent connection message is received, the configuration manager may be programmed to send an alert notifying an administrator of relevant information regarding a client device (e.g., first or second client device) that failed to send the persistent connection message.

One or more timeout may be configured to expire. The user agent may create a Packet Data Protocol (PDP) context for one or more persistent connection messages and may optionally establish a connection to the configuration manager. The user agent may be configured to send at least one persistent connection message to the configuration manager and may be configured to send a response comprising output data generated by an API to the originating client device.

Implementations consistent with the present disclosure may utilize the Simple Initiation Protocol (SIP), Session Initiation Protocol for Instant Messaging and Presence Leveraging Extension (SIMPLE), IMF, and/or text messages sent utilizing (but not exclusive to) User Datagram Protocol (UDP) or Transmission Control Protocol (TCP). SIP or other protocol(s) may be used to set up a session and media packets may be created as Real-Time Transport Protocol (RTP) packets or similar protocols and can be sent as part of UDP packets.

In various embodiments, when a client device (e.g., first or second client device) includes an Android operating system, the at least one platform dependent API uses an Android library; when the client device includes a Windows Mobile operating system, the at least one platform dependent API uses a Microsoft library; when the client device includes a Symbian operating system, the at least one platform dependent API uses a Symbian library; and when the client device includes an Apple operating system, the at least one platform dependent API uses an Apple library.

One or more connections between one or more devices or components may have its own unique code, which optionally acts as an identifier for the route that should be used to send a message to a specific device. One or more communications or communication paths described herein or within the path of one or more connections described herein may be encrypted with Transport Layer Security (TLS) using a client-side certificate, that is requested by a device on the activation of a message, or Rivest-Shamir-Adleman (RSA) public-key cryptosystem utilizing a key exchange, or other encryption methodology.

Metadata information obtained from one or more user agents may be taken in a relatively limited area (e.g., when a client device such as a first or second client device is carried by a user who is walking, or over wide-ranging geographic area such as a user in a car or a train. The monitoring campaign may be initiated at an arbitrary time or as a part of a schedule including multiple monitoring campaigns.

A global navigation satellite system (GNSS) such as the Global Positioning System (GPS) or the Galileo Positioning System may be used to obtain a location (also referred to as position data) of the client device (e.g., first or second client device). As used herein, although referred to as a client device it should be appreciated that a client device may be a mobile and/or fixed device, either physically or virtually, either in whole or in part, without departing from the spirit and scope of the present disclosure. The location obtained from the GNSS may be considered a metadata collection value. The value of the location obtained from the GNSS at a specific time can be considered a separate metadata collection value. It may be useful to correlate other metadata collection measurement values with location values to perform one or more operations and/or to make one or more determinations.

Furthermore, beyond geography, persistent connections can send information about a user's frequency of interaction with the user agent, a time of usage, a length of usage, as well as metadata and a record of text and/or graphical content sent and/or received. Additional metadata that may be collected include EXIF data associated with photographs and images, usage of emojis and other keyboard-based characters, biometric information, Bluetooth status, near-field technology status, battery charging status, local weather status, applications in use, and any other obtainable metric or information relating to any device, system, or operation.

One or more persistent connection messages from a user agent may be used to build a map including the location of the client device corresponding to a user agent. In one exemplary embodiment, if there are a number of user agents being monitored, the persistent connection messages from all the other monitored user agents may be used to generate a map of all active or inactive user agents. A user agent may periodically send one or more logs to a data gathering server. One or more data gathering server may be implemented, for example, in whole or in part as or using a backend server 2620 previously described herein. Data from the data gathering server may be analyzed on an analysis server (which may be provided by the data gathering server and/or remote from the data gathering server in various embodiments). An analysis server may utilize one or more parameter settings to determine what actions and/or communications to delivery to a user. The processes described herein may be configured to repeat until a designated termination point.

Implementations consistent with the present disclosure may include persistent (or semi-active) connection with communications such as text messaging. When a message is loaded or is displayed, a messaging application or communication component associated with a device may be configured to actively go back to a server for a refresh of at least a portion of information. This is in contrast, for example, to existing SMS text messaging, which only shows what was originally downloaded, like an animated GIF file, and is stored on the local storage at the device. Instant messaging and other communication systems may have a persistent connection but look for incoming new content—not content that has already been sent and is being updated or modified.

In various embodiments consistent with the present disclosure, one or more content elements (e.g., "klickables") may be configured to stay live for a specified period of time. For example, a sale item might only be available today. There might be a reason for a klickable to disappear after so long. A random klickable with a different URL may be provided to give a prize away. The URL may be chosen, for example, based at least in part upon a location, a time, etc. A klickable may be sent but it might not be able to be opened until a specified time—for example as a midnight release for a movie or an album so the klickable is only capable of interaction after midnight. One or more geographic locations (e.g., of a user device, a business, or other entity) may be utilized. For example, a coupon may be delivered for a McDonald's restaurant while a user device is less than 15 minutes or 15 miles away from the store location, and may provide a time limit, such as 25 minutes, for the coupon to be redeemed. The coupon may be selectively retrieved by a user, for example at a first or second client device, and/or may be pushed to the user device using one or more push communication technologies, and/or based at least in part upon a partnership or relationship between one or more of a user, a user device, a communication provider associated with the user and/or user device, a promoter, a business, or any other entity.

A sender of a klickable in one or more embodiments may be an individual or may correspond to an automated server request from a company. The sender may select a predefined expiration-based emoji or may customize an emoji with one or more expiration-based components. Components may include (but are not limited to) a time, a location (e.g., GPS-based, general, or self-selected), a heart rate or other biometric data, or any other type of location, user, device, and/or system information. For example, a company may send a user a text message asking if they would like a bonus gift if they complete a week's goal of running—the text message may be configured to activate or include a component configured to monitor the user's heart rate over the week to determine whether the user has met the goal, and the text message may be configured to convert to a congratulatory message including a redeemable coupon if the user satisfies the corresponding requirement(s).

A user may be provided with an ability to text message his or her trainer to review training in real-time and to give input. The trainer may be provided with temporary access to the client's biometric emoji which may be configured to update with the client's heart rate and/or other biometric data. The trainer may be permitted to provide feedback such as a message to continue keeping their heart rate above 110 for the next five minutes, and subsequently to lower the heart rate over the next five minutes, etc.

In various embodiments, a price may change based at least on a particular user (or a user's spending habit dictates what kind of coupon they get, etc.), redemptions, ties into a user's credit or debit card, electronic payment system such as Venmo or PayPal, may look at purchases made from a particular source of goods or services over a time period such as a month, spending at a particular store, or other criteria, and may update one or more times based at least in part upon spending, usage, number of transactions, etc. A randomizing element may be configured to provide a klickable, for example providing a klickable reward to 1 of 1000 purchasers, a lottery-style system for ticket awards or purchases, etc.

Wireless communication protocols such as Bluetooth, Near-Field Communication (NFC) or other technology may be implemented to provide at least one of identification and/or messaging at a location such as a store. Additionally or alternatively, a user device such as a first or second client device may be configured to communicate or couple with an electronic element to obtain a coupon for an associated good or server, and/or an unassociated good or service.

In various embodiments, a phone charging status may be used as an option for selecting a phone battery coupon to appear when a phone as reached a low charge one or more times during a specified period such as a day. Additionally or alternatively, a charging type or parameter (e.g., wired or wireless charging) may be used to determine one or more klickable criteria or parameter selection (e.g., if charging via wire a coupon for a wireless charging component may be provided).

In additional embodiments, a person who was shopping somewhere often and has recently returned less frequently may be provided with an incentive to return to the shopping location using the systems and methods provided herein.

One or more sets of weather and/or climate-based criteria (e.g., rainfall, snow, temperature, etc.) associated with a location of at least one of the user and/or user device may be used herein.

Implementations consistent with the present disclosure may include the ability to tie into third-party apps, such as a Maps app on a user's client device. The system and/or Maps app may be configured to message user about historical and/or predictive information, such as recalling previous patterns and/or predicting or suggesting one or more locations of goods or services of interest to, relating to, or otherwise associated with a user and/or user device (and selectively, within a predetermined and/or dynamically determined range of at least one of the user and/or user device). In such a scenario, historical and/or predictive information may be used as at least one of conditional information, one or more conditional parameter, and/or one or more sets of contextual information or data.

Additionally or alternatively, a user may provide a company with the ability to message the user when they are near the user's location or home, for example during a specified period of time such as a week. The company may message the user to say that they are nearby and available to stop by within the next time period, such as thirty minutes to provide goods or services to the user (e.g., a cable provider to provide troubleshooting or installation). In such an embodiment, systems consistent with the present disclosure may be capable of operating as a concierge on behalf of one or more entities for communications with a client or other entity.

Embodiments consistent with the present disclosure may include constantly updating or checking message content such as emojis, images, and/or text that may be updated in real-time as a user moves. This may be for example an embedded map that shows user locations and shows a user getting closer to a desired location, such as a treasure map game or coupon to use at a specific store. Other embodiments may incorporate biometric data, such as heart rate data for a user or user's spouse as they go for a jog.

An exemplary embodiment of a user-to-user interaction according to aspects of the present disclosure begins with a User A opening a messaging application on an electronic device (e.g., a first client device). The messaging application may be, for example a text message application or a third-party messaging application. Additionally or alternatively, at least a portion of the messaging application may be provided by an operating system of the electronic device or may be implemented in whole or in part by a network-connected interface such as a browser executing upon or communicatively accessible to the electronic device. The User A may select target recipient(s) (e.g., including User B) using the messaging application's interface displayed on their electronic device. User A may then begin composing a message. User A may insert a media file (e.g., an emoji, an image, a video, an animated GIF, an audio file, etc.). User A may be presented with the ability to associate with one or more media file(s). User A may select, customize, and/or insert a number of enhanced content items including, but not limited to, one or more of:
  a. Conditional-based Media File: User A can select an image whose properties (appearance, hyperlink, etc.) may change based on conditional-parameters set;
  b. Parameters options relating to Sender or Receiver (e.g., conditional parameters) may include, but are not limited to:
    i. Time-based (e.g., one hour from now; 11:55 AM; ten minutes before a specific calendar entry; on User B's birthday; etc.),
    ii. Action-based (e.g., a biometric attribute such as when User B has walked 1,000 steps or has a heart rate over 95 bpm; when User B has clicked on link; when User B gets within 1,000 feet of specific location; when User B has moved target device; when User B has connected target device to Bluetooth accessory; when User B is in transit, etc.),
    iii. a URL or other type of link,
    iv. Geolocation parameter(s),
    v. User-interest parameter(s),
    vi. User profile-based parameter(s),
    vii. News or trending data,
    viii. One or more actions based on analytical information,
    ix. Changes in financial markets or currency exchange rates,
    x. Historical or real-time sales data,
    xi. Distance traveled,
    xii. User Calendar information,
    xiii. Local or national events,
    xiv. Historical, current, or forecasted weather, climate, or temperature,
    xv. Parameters based on actions taken by users near the user or correlated to the user,
    xvi. One or more user defined settings/parameters,
    xvii. Application usage or applications running on a user's device,
    xviii. One or more actions taken on user's social media & online accounts,
    xix. One or more actions taken on social media & online accounts of nearby users or correlated to the user,
    xx. Medical Condition(s),
    xxi. Biometric Data (such as heart rate, hormonal or chemical levels such as insulin level, eye movement, height, weight, average rate and amount of movement, etc.),
    xxii. One or more past selections received from similar users,
    xxiii. One or more past choices or preferences,
    xxiv. Internal or third-party reviews,
    xxv. Algorithm or logic-based criteria or selections,
    xxvi. One or more personal preferences (e.g., political, music genre, sports team, etc.),
    xxvii. Current, previous, or future possessions of a user or that the user has access to,
    xxviii. Electronic device status (e.g., if a user's phone or tablet device is in do not disturb mode, or if the user's electronic device has not been used recently and it is typically at a time they do not use the device for a period of time (for example, while sleeping)),
    xxix. One or more editable or user-defined parameters,
    xxx. Device status (e.g., battery level, type of device, operating system version, storage space, current orientation, etc.), and/or
    xxxi. Status of connected devices (e.g., vehicle, speakers, headphones, wearable device, etc.)

A message may then be sent to an Application Server 2610. The Application Server 2610 may extract content, such as an image or other data or metadata, from one or more parameters of the content or associated with the content and may generate or access a corresponding link. This data (e.g., content, image, parameter(s), and/or link) may be stored in one or more databases associated with user(s) on the Application Server 2610 or a separate Data Gathering Server. Parameters or associated metadata may include information such as:

Example: User A sends User B a conditional-based hyperlinked image for the band U2: the message may generate a link to a ticketing website for a concert venue that is within 100 miles of User B if U2 is on tour and will be within 100 miles of User B in the next 90 days:
  a. User type=Individual
  b. Date stamp
  c. Condition 1 type=Time
  d. Criteria=>90 days
  e. Condition 2=Geographic
  f. Criteria=>100 miles
  g. Condition 3=Interest=U2 on tour
  h. Criteria=True or False
  i. Condition for all of above
  j. Criteria=If True: provide link to venue; If False: provide link to default U2-related page)

The Application Server 2610 may be configured to maintain a persistent connection with the message. The Application Server 2610 may be configured to perform one or more sets of runtime logic for aspects of the above criteria and may generate an appropriate link. Activity relating to the message and actions taken on it may be sent to the Data Gathering Server and/or an Analysis Server. The Application Server 2610 may maintain a persistent connection until a related parameter expires and/or one or more system settings set a policy for a predetermined or dynamically determined persistent connection duration. The message is delivered to User B via the Application Server 2610, Communications Server, or a third-party messaging API server in various embodiments. The Application Server 2610 may update at least a portion of message content in accordance with one or more parameters (e.g., when User B travels to another city the message may update with a link to a venue within 100 miles of User B's current location). One or more status parameters and changes to persistent connection messages may be sent to Application Server 2610 and stored on Application Server 2610 or Data Gathering Server, examples of which follow:

a. Has Target Recipient (e.g., User B, etc.) opened message=True/False
b. Clicked on Link=True/False
 i. If True, record Time Stamp & GPS location
 ii. If True, determine actions taken on the resulting page(s)
c. Updated GPS location(s) of Target Recipients
d. Forwarded Message=True/False
 i. If True, record Time Stamp, GPS location and user information
e. Deleted Message=True/False
f. Unsubscribed from Message=True/False The analysis server may be configured to query the Application Server 2610 and/or the Data Gathering server(s) to perform actions such as offering similar content items to sender/recipients, or to update a Trending list, or other predictive content functionality.

Various real-world applications may be provided in accordance with the present disclosure to provide new uses and improvements to previous systems. For example, a user may be permitted to wear a pair of tech-enabled eyeglasses or other electronic device which may be communicatively coupleable to a user's phone or other electronic device and the user may permit operation with the systems, apparatuses, and methods described herein. When the user sees a pair of tennis shoes designed by a particular brand, such as Nike®, the user may have opted in to receive information from or in association with the brand to cause at least one action to be performed. For example, the brand may be permitted to send at least one conditional parameter-based message regarding the tennis shoes or any other product in association with the tennis shoes or any other product (e.g., as viewed through the eyeglasses), any may provide the user with a store location nearby along with a time-oriented discount (e.g., as a conditional parameter of a communication associated with a message providing the discount).

An exemplary embodiment of an organization-to-user interaction according to aspects of the present disclosure begins with the Organization opening a web browser-based or messaging application (e.g., desktop and/or client device). In various embodiments, a user associated with the Organization may perform one or more operations described herein using a client device or any other electronic device capable of performing at least one action described herein, either in whole or in part. Although described as actions performed by the Organization, it should be appreciated that one or more actions may be performed by an entity operating on behalf of the Organization or in place of the organization (e.g., an employee, a contractor, a third-party, or any other entity). The Organization may be permitted to select one or more target recipient(s) (e.g., User B) using the web browser and/or messaging application's interface. The Organization may then begin composing a message. The Organization may insert content such as a media file (e.g., an emoji, an image, a video, an animated GIF, an audio file, etc.), The Organization may be presented with options to associate with content. The Organization can select, customize, and insert a number of enhanced content items including:

a. a conditional-based Image: Can select an image whose properties (e.g., appearance, hyperlink, etc.) can change based on conditional-parameters set or determined.
b. Parameters options relating to Sender or Receiver may include, but are not limited to, one or more of:
 i. Time-based (e.g., one hour from now; at 11:55 AM; ten minutes before a specific calendar entry; on User B's birthday; etc.),
 ii. Action-based (e.g., biometric attribute(s) such as when User B has walked 1,000 steps or has a heart rate over 95 bpm; when User B has clicked on link; when User B gets within 1,000 feet of specific location; when User B has moved target device; when User B has connected target device to Bluetooth accessory; when User B is in transit, etc.),
 iii. a URL or other type of link,
 iv. Geolocation parameter(s),
 v. User-interest parameter(s),
 vi. User profile-based parameter(s),
 vii. News or trending data,
 viii. Actions based on analytical information,
 ix. Changes in financial markets or currency exchange rates,
 x. Historical or real-time sales data,
 xi. Distance traveled,
 xii. User Calendar information,
 xiii. Local or national events,
 xiv. Historical, current, or forecasted weather, climate, or temperature,
 xv. Parameter(s) based on actions taken by users near the user or correlated to the user,
 xvi. User defined settings/parameter(s),
 xvii. Application usage or applications running,
 xviii. One or more action(s) taken on user's social media & online accounts,
 xix. One or more actions taken on social media & online accounts of nearby users or correlated to the user,
 xx. Medical Condition(s),
 xxi. Biometric Data (such as heart rate, hormonal or chemical levels such as insulin level, eye movement, height, weight, average rate and amount of movement, etc.),
 xxii. One or more past selections received from similar users,
 xxiii. One or more past choices or preferences,
 xxiv. Internal or third-party reviews,
 xxv. Algorithm or logic-based criteria or selections,
 xxvi. One or more personal preferences (e.g., political, music genre, sports team, etc.),
 xxvii. Current, previous, or future possessions of a user or that the user has access to,
 xxviii. Electronic device status (e.g., if a user's phone or tablet device is in do not disturb mode, or if the user's electronic device has not been used recently and it is typically at a time they do not use the device for a period of time (for example, while sleeping)),
 xxix. One or more editable or user-defined parameters,
 xxx. Device status (e.g., battery level, type of device, operating system version, storage space, current orientation, etc.), and/or xxxi. Status of connected devices (e.g., vehicle, speakers, headphones, wearable device, etc.)

A message may then be sent to an Application Server 2610. The Application Server 2610 may extract content, such as an image and/or other content, from one or more parameters and may selectively determine and/or generate a corresponding link. This data and/or corresponding metadata (e.g., image, parameters, and link) may be stored in one or more database(s) associated with one or more user(s) on the Application Server 2610 and/or a separate Data Gathering Server. Parameters or associated metadata may include information such as:

Example: Organization sends User B a conditional-based hyperlinked image for a coupon for a free coffee for Wednesday of next week when User B has a coffee meeting set in their calendar: the message will generate a link to a coupon for a Starbucks that is within 10 miles of User B's meeting 7 days before the meeting. The following information may be used by the system and associated with the conditional-based hyperlinked image for coupon:
  a. User type=Organization
  b. Date stamp
  c. Condition 1 type=Time
  d. Criteria=>7 days
  e. Condition 2=Calendar entry
  f. Criteria=Coffee Meeting
  g. Condition 3=Geographic
  h. Criteria=>10 miles of current or meeting location
  i. Condition for all of above
  j. Criteria=If True: provide link to Starbucks coffee coupon; If False: no message sent The Application Server 2610 may maintain a persistent connection with the message. One or more persistent connection(s) may be provided using a persistent connection-type protocol, for example using HTTP/2, HTTP/3, websockets, EventSource, and/or Serversent events. Based on type of conditional parameter, the system may use a protocol such as the Transmission Control Protocol (TCP) and/or User Datagram Protocol (UDP). The Application Server 2610 may perform at least one set of runtime logic for at least one of the above criteria and may generates an appropriate link. Activity relating to the message and actions taken on it may be sent to Data Gathering Server and/or Analysis Server. The Application Server 2610 may maintain a persistent connection until a related parameter expires or system settings set policy for persistent connection duration. The message is delivered to User B via the Application Server 2610, Communications Server, and/or third-party Messaging API server. The Application Server 2610 may update message content as instructed by parameters (e.g., when User B travels to another city the message may update with a link to a venue within 100 miles of User B's current location). One or more status parameters and/or change(s) to persistent connection message may be sent to the Application Server 2610 and may be stored on the Application Server 2610 and/or Data Gathering Server(s), examples of which follow:
  a. Have Target Recipients (User B, etc.) opened message=True/False
  b. Clicked on Link=True/False
    i. If True, record Time Stamp & GPS location
    ii. If True, what actions did they take on the resulting page(s)
  c. Updated GPS location(s) of Target Recipients
  d. Forwarded Message=True/False
    i. If True, record Time Stamp, GPS location and to who
  e. Deleted Message=True/False
  f. Unsubscribed from Message=True/False An analysis server may query one or more Application and/or Data Gathering server(s) to perform actions such as offering similar content items to sender/recipients, or to update a Trending list, or other predictive content functionality. The Organization may be able to run a query on servers to view analytic & usage data associated with messages Organization has sent. The Organization may also set one or more action-based, machine-learning, and/or Artificial Intelligence (AD-based actions based on this data.

General implementations consistent with the present disclosure may include asynchronous and/or synchronous updateable messaging of content such as emojis and images. In practice, a sender using a User Agent executed by or accessible to a user device of the sender may select a content element (e.g., a media file). The content element may include, without limitation, emoji data or metadata, image data or metadata, icon data or metadata, audio data or metadata, text data or metadata, or any other form of data or information, combination thereof, or metadata associated with such or with such combination. The content may be selected from local or remote storage location or a virtual reference (e.g., remotely via a network link such as a URL). The sender may select one or more conditions and/or contextual parameters.

Examples of information relating to or otherwise associated with conditions and/or contextual parameters may include one or more of:
  a. URL or other type of link,
  b. Time to begin activation,
  c. Time to expire,
  d. Geolocation parameters,
  e. User-interest parameters,
  f. User profile-based parameters,
  g. News or trending data,
  h. Actions based on analytical information,
  i. Changes in financial markets or currency exchange rates,
  j. Historical or real-time sales data,
  k. Distance traveled,
  l. User Calendar information,
  m. Local or national events,
  n. Historical, current, or forecasted weather, climate, or temperature,
  o. Parameters based on actions taken by users near the user or correlated to the user,
  p. User defined settings/parameters,
  q. Application usage or applications running,
  r. Actions taken on user's social media and online accounts,
  s. Actions taken on social media and online accounts of nearby users or correlated to the user,
  t. Device status (e.g., battery level, type of device, operating system version, storage space, current orientation),
  u. Status of connected devices (e.g., vehicle, speakers, headphones, wearable device, etc.), and/or
  v. Transfers to Application Server 2610

The Application Server 2610 may extract content data such as image or emoji data from criteria and/or contextual parameters and may link to data stored in one or more database(s) associated with user(s) on the Application Server 2610 and/or a separate Data Gathering Server, either alone or in combination. The Application Server 2610 may also serve as a security device associating user token with third-party applications or APIs. A persistent connection may be established between a User Agent and the Application Server API and/or one or more third-party APIs. A persistent connection may not be established, or a timeout may expire in various scenarios. The User Agent may create a Packet Data Protocol (PDP) context for the persistent connection message and may establish a connection to the Application Server/Configuration Manager. A response comprising output data generated by the API may be sent to the originating client device and one or more target device (s). An Analysis Server or Communications Server may be utilized during any part of the above-described process without departing from the spirit and scope of the present disclosure. Elements of this message may be stored locally on originating client device, target device or on servers for future usage or analysis. Associated API(s) may communicate with target device to enforce parameter actions, examples include but are not limited to:

a. Disable a link once a time expiration is reached,
b. Enable a function upon arrival at a geolocation,
c. Provide content based on device status,
d. Change content (e.g., such as an image) based on one or more defined parameters, and/or
e. The target device user may interact with the message which communicates to the API(s) and may trigger additional actions or responses by the API(s) or originating client.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

What is claimed is:

1. A computer-implemented method for providing conditional message content in a messaging system, the method comprising:

receiving a message between a first client device and a second client device at an application server via a network;

interpreting the received message and selectively extracting at least one content element associated with the received message, wherein the at least one content element comprises at least one contextual parameter associated with at least one specified condition;

detecting a first event associated with the second client device and that meets one or more of the at least one specified condition;

upon detecting the first event, inserting a content link, associated with and accessible through the extracted content element, into the message based at least in part upon the one or more of the at least one specified condition met by the first event;

transmitting the message including the content link to the second client device via the network;

upon selection of the content link within the message, directing the second client device to predefined content associated with the contextual parameter;

monitoring for changes to the predefined content associated with the contextual parameter or to the at least one specified condition;

via a persistent link with the transmitted message, and upon detecting a change in the at least one specified condition, monitoring to detect a second event associated with the second client device and that meets one or more of the changed at least one specified condition;

upon detecting the second event, re-transmitting the message including the content link to the second client device;

upon detecting a change in the predefined content associated with the contextual parameter, further altering the content link within the transmitted message to generate a modified message including the altered content link; and upon selection of the altered content link within the message, directing the second client device to the changed content associated with the contextual parameter.

2. The computer-implemented method of claim 1, further comprising monitoring messaging between the first client device and the second client device to determine the at least one contextual parameter related to the content.

3. The computer-implemented method of claim 2, wherein the contextual parameter includes a social parameter, a message content condition, or device information of the first client device or the second client device.

4. The computer-implemented method of claim 1, wherein the content of the received message includes image data.

5. The computer-implemented method of claim 1, further comprising storing a representation of at least one of the received message, the content, or at least one feature of the content at a database by storing the representation and further includes mapping the representation to at least one message or content condition.

6. The computer-implemented method of claim 5, further comprising referencing the at least one message or condition in real-time while monitoring communications received from at least one client device.

7. The computer-implemented method of claim 6, further comprising modifying the content of at least one message of the monitored communications based at least in part upon the at least one message or content conditional parameter.

8. The computer-implemented method of claim 1, wherein the at least one specified condition is time-based and/or location-based and/or action-based.

9. The computer-implemented method of claim 1, wherein the method further comprises determining, via the persistent link, whether further alterations to the message are needed, and transmitting the altered message only when no further alterations are necessary.

* * * * *